US005874570A

United States Patent [19]

Tamura et al.

[11] Patent Number: 5,874,570

[45] Date of Patent: Feb. 23, 1999

[54] TITANYLOXYPHTHALOCYANINE CRYSTALS, AND METHOD OF PREPARING THE SAME

[75] Inventors: Shinichi Tamura; Youichi Tei; Naoki Itoh; Kazumi Egota; Kenichi Ohkura, all of Kawasaki, Japan

[73] Assignee: Fuji Electric Co., Ltd., Kanagawa, Japan

[21] Appl. No.: 13,197

[22] Filed: Jan. 26, 1998

Related U.S. Application Data

[62] Division of Ser. No. 645,322, May 13, 1996, Pat. No. 5,736,282.

[30] Foreign Application Priority Data

Nov. 10, 1995 [JP] Japan .................................... 7-292417

[51] Int. Cl.[6] ............................ C09B 67/50; G03G 5/047

[52] U.S. Cl. .......................... 540/141; 540/140; 540/122; 430/59; 430/58; 430/78; 430/83

[58] Field of Search ............................... 540/141; 430/59

[56] References Cited

U.S. PATENT DOCUMENTS

| | | | |
|---|---|---|---|
| 2,297,691 | 10/1942 | Carlson | 430/31 |
| 5,114,815 | 5/1992 | Oda et al. | 430/58 |
| 5,190,839 | 3/1993 | Fujimaki et al. | 430/78 |
| 5,252,417 | 10/1993 | Tokida et al. | 430/58 |
| 5,290,928 | 3/1994 | Nukada et al. | 540/141 |
| 5,298,353 | 3/1994 | Ohmori | 430/58 |
| 5,350,655 | 9/1994 | Oshiba et al. | 430/78 |
| 5,736,282 | 4/1998 | Tamura et al. | 430/59 |

FOREIGN PATENT DOCUMENTS

| | | |
|---|---|---|
| 0 384 470 | 8/1990 | European Pat. Off. . |
| 0 404 131 | 12/1990 | European Pat. Off. . |
| 59-49544 | 3/1984 | Japan . |
| 59-166959 | 9/1984 | Japan . |
| 61-217050 | 9/1986 | Japan . |
| 61-239348 | 10/1986 | Japan . |
| 62-67094 | 3/1987 | Japan . |
| 62-134651 | 6/1987 | Japan . |
| 63-364 | 1/1988 | Japan . |
| 63-366 | 1/1988 | Japan . |
| 63-198067 | 8/1988 | Japan . |
| 1-123868 | 5/1989 | Japan . |
| 2-193152 | 7/1990 | Japan . |
| 2-281262 | 11/1990 | Japan . |
| 3-81788 | 4/1991 | Japan . |
| 3-145652 | 6/1991 | Japan . |
| 3-288157 | 12/1991 | Japan . |
| 4-31870 | 2/1992 | Japan . |
| 4-174442 | 6/1992 | Japan . |
| 5-320167 | 12/1993 | Japan . |

OTHER PUBLICATIONS

Kumano, Denshi Shashin Gakkai–shi, pp. 111–120, vol. 22 No. 2, "Synthesis and Physical Properties of Phthalocyanine Pigments," 1984.

Sawada, Dyes and Chemicals, "Phthalocyanine Pigments for Electrophotoconductor," vol. 24, No. 6, pp. 122–128, 1979.

Journal of Imaging Science and Technology, vol. 37, No. 6, pp. 607–609, "Study of the Relationship Between Crystal Structure and Photosensitivity of Phthalocyanine Pigments," Oka et al., Nov./Dec. 1993.

*Primary Examiner*—Mukund J. Shah
*Assistant Examiner*—Pavanaram K. Sripada
*Attorney, Agent, or Firm*—Spencer & Frank

[57] ABSTRACT

A titanyloxyphthalocyanine crystal to be used as a charge generation material for an electrophotographic photoreceptor, having a maximum diffraction intensity observed at Bragg angle (2 θ) of 9.6°±0.2° and clear peaks of diffraction intensity observed at 7.22°±0.2°, 9.60°±0.2°, 11.60°±0.2°, 13.40°±0.2°, 14.88°±0.2°,18.34°±0.2°, 23.62°±0.2°, 24.14°±0.2°, and 27.32°±0.2°, respectively, in an X-ray diffraction spectrum obtained by performing an x-ray diffraction method using CuKα as a source of radiation. A method for preparing the crystal includes dispersing a predetermined amount of amorphous titanyloxyphthalocyanine in an aqueous solution in which ionic substances are dissolved, under mechanical force at a temperature of under 50° C., to obtain a mixture composed of a fine dispersion of titanyloxyphthalocyanine; adding a non-aqueous organic solvent to the mixture to shift the fine dispersion of titanyloxyphthalocyanine from an aqueous phase to a non-aqueous organic solvent phase; and removing the non-aqueous organic solvent phase to obtain a pellet of titanyloxyphthalocyanine crystal.

4 Claims, 7 Drawing Sheets

TITANYLOXYPHTHALOCYANINE CRYSTALS, AND METHOD OF PREPARING THE SAME

This is a division of application Ser. No. 08/645,322 filed May 13, 1996 now U.S. Pat. No. 5,736,282.

BACKGROUND OF THE INVENTION

1. Field of the Invention

The present invention relates to a novel titanyloxyphthalocyanine crystal, a method for preparing such crystal, and an electrophotographic photoreceptor that comprises the titanyloxyphthalocyanine crystal as a charge-generation material.

2. Description of the Prior Art

After inventing a principal theory of the process of electrophotography by C. F. Carlson in 1937, the electrophotographic technologies have been dramatically developed and applied in the devices for processing information, such as digital photocopying machines, laser printers, light-emitting diode printers, and facsimile machines.

The electrophotography is an image-forming method that depends on a skillful combination of photoconductive characteristics and electrostatic phenomena of the electrophotographic photoreceptor(C. F. Carlson, U.S. Pat. No. 2,297, 691, 1942) That is, the electrophotography is characterized by the process comprising the steps of:

charging a surface of the electrophotographic photoreceptor by subjecting to colona discharge in darkness;

producing an electrostatic latent image including characters, pictures, and the like in an original by exposing the charged surface of the photoreceptor to light;

visualizing (i.e., developing) the electrostatic latent image by using toner (i e., colored and charged particles) that adheres to the charged surface of the photoreceptor for transforming the latent image into a real image; and transferring the developed toner image to a surface of substrate (e g., a sheet of paper) and fixing the image thereon.

Then the photoreceptor is discharged and cleaned of any excess toner using coronas, lamps or the like for recycling the photoreceptor.

In accordance with the above electrophotography, it is possible to digitize an original image of document by scanning and exposing a surface of the photoreceptor to light emitted from a light source such as a semiconductor laser or a light-emitting diode (LED). Therefore, an input image information can be recorded by converting an output of the data-processing device into a plurality of dots of light, and scanning and exposing the surface of the photoreceptor by using these dots. As the information-processing has been advanced and sped up in recent years, the data-processing devices (such as laser printing machines and digital copying machines which perform the high-qualified image formation at a predetermined high printing speed) have been sprung into wide use. Especially in the case of using the semiconductor laser as a source of exposure light in the above information-processing device, it is not only possible to provide a comparatively small and cheap device but also possible to provide the device having a high reliability and a high image quality. Thus the photoreceptor has been investigated and developed so as to have an excellent sensitivity against the light emitted from the semiconductor laser to be used as the above light source.

Currently, by the way, a wavelength of the light generated by the semiconductor laser in practical use has been limited to in the range of comparatively long wavelengths of near infrared ray (i.e., about 700–800 nm) Consequently, it has been required that the photoreceptor to be applied in the device that uses a semiconductor laser as an exposure light source should be of a high sensitivity against the above wavelengths. In addition, it has been also required that such photoreceptor should have the properties of being stable in repeat use and in various environmental conditions. That is, the needs for preventing the changes in electrical characteristics of the photoreceptor, the qualities of output images, the generation of memory, and the like are constantly increased in repeat use.

For the above requests, therefore, charge-generation materials have been studied and developed. In general, the following materials are known as the charge-generation materials: polyazo pigment, phthalocyanine pigment, azulenium base pigment, pyrylium pigment, and naphthoguinone pigment. However, the naphthoquinone pigment is of no practical use because of its insufficient photosensitivity. In case of the azulenium base pigment and the pyrylium pigment, their chemical constructions are unstable under a strong light such as a laser beam. In case of the phthalocyanine pigment, on the other hand, it has the following advantages compared with the others. That is, (1) the phthalocyanine pigment is chemically and physically stable and in general used as a color pigment of color ink, coating compound, or the like;

(2) the phthalocyacine pigment is easily prepared;

(3) the phthalocyanine pigment has the ability of absorbing light at the wavelengths of ending up to the long wavelengths of near infrared ray; and (4) the light absorption wavelengths and photoconductivities of the phthalocyanine pigment are depended on the types of its central atom, crystal form, and preparation method, so that the big variations in these characteristics of the phthalocyanine can be occurred.

From the above point of view, therefore, the phthalocyanine pigment can be provided as a preferable charge generation material of an electrophotographic photoreceptor.

The following pigment compounds have been studied for finding an appropriate type of the phthalocyanine pigment to be used as the charge generation material. For example, ε-type copper phthalocyanines, X-type nonmetal phthalocyanines, t-type nonmetal phthalocyanines, chloroaluminium phthalocyanine, chloroindium phthalocyanine, chlorogallium phthalocyanine, chloro-germanium phthalocyanine, vanadyloxy phthalocyanine, and titanyloxy phthalocyanine have been studied. Among these pigments, the titanyloxyphthalocyanine has attracted a great deal of public attention because of the following reasons. That is, the nonmetal phthalocyanines and the divalent metallic phthalcyanines do not have sufficient photo-sensitivities against the laser beam at the wavelengths of near infrared region. In addition, the trivalent and quadrant metallic phthalocyanines have disadvantages that their electric characteristics are changed in accordance with the progress of hydrolysis in which their chemical compounds are gradually decomposed by the reaction with water in the atmosphere. However, the quadrant metallic phthalocyanine having the metal connected with oxygen atom shows stable electric characteristics. Especially in recent years, therefore, titanyloxyphthalocyanine has been energetically studied for providing it as a charge-generation material and disclosed in the documents, for example Japanese Patent Application Publication No. 49-4338 that discloses titanium phthalocyanine as an example of metal phthalocyanine to be used as a photoconductive material of a resin-dispersed photoreceptor in the type of having a photosensitive layer formed as a single layer (hereinafter, it will be referred as a mono-type photoreceptor).

By the way, a laminate-type photoreceptor having a photosensitive layer formed as a laminate of functionally distinguishable layers (a charge generation layer and a charge transport layer) shows excellent electrophotographic properties compared with that of the mono-type photoreceptor. Accordingly, the above described titanyloxyphthalocyanine have been investigated as a material to be applied in a charge-generation layer of the laminate-type photoreceptor as described below.

In the documents of Japanese Patent Application Laying-open Nos. 59-49544 and 59-166959, deposit films of titanyloxyphthalocyanine to be used as charge generation layers are disclosed. However, the deposition for preparing a charge generation layer is not appropriate for the mass production because it requires the large investment in plant and equipment such as vacuum deposition system and results in costly production of electrophotographic photoreceptor.

For the industrial production, therefore, it is preferable to make a charge generation layer by a coating method comprising the steps of dispersing and dissolving both a charge generation material and a binder in a solvent to prepare a coating solution and applying the obtained solution on a surface of a substrate to form the charge generation layer. However, the photoreceptor having the charge-generation layer provided as a film formed by the coating method is not advantageous to the one obtained by the deposition method with respect to their electric characteristics, image-characteristics, and the changes in the characteristics by repeat use.

Comparing with the photoreceptor obtained by the deposition method, the photoreceptor obtained by the coating method shows a low charge retentivity, a high residual potential, and almost 40 percent low spectral sensitivity (e.g., one of the examples is described in an official gazette of Japanese Patent Application Laying-open No. 59-49544). About the cause, the charge-generation material does not work uniformly and effectively in the coated charge-generation layer being formed unevenly by an effect of settling out or aggregating the charge-generation material as a result of the unstable dispersion of the charge-generation material being dispersed in the solvent. Besides, the trapping of charge carriers and the dropping of photo sensitivity are observed at the portion where the content of the charge generation material is lowered. During the repeat use of the photoreceptor, the photo sensitivities are changed and image ghost and memory phenomena are generated. In addition, another portion where the charge generation material is comparatively concentrated may be responsible for the image noise because of the difference in electric properties between the portion where the charge generation material is comparatively concentrated and its surroundings.

Accordingly, these phthalocyanines must be contented with many required characteristics not only their electrical characteristics but also their dispersion stabilities and the like, for using them as charge-generation materials in the coating method for preparing a photoreceptor.

Regarding the electrical characteristics in an initial state, it must be of having excellent electrical characteristics such as an excellent photosensitivity, an excellent static electrification, and a small residual potential, and also it must be stable in darkness without causing gradual deterioration to an inferior state. It is further required that the photoreceptor must be of having a cycle stability, i.e., keeping its electrical characteristics in stable during and after the period of using the photoreceptor repeatedly. Furthermore, the charge-generation material must be of keeping a dispersion stability without causing any troubles such as coagulation, sedimentation, and crystal growth in a coating solution for a long time.

It has been known that the electrical characteristics of phthalocyanine depends largely on its coordinated metal species. Also, the phthalocyanine shows different properties of static electrification, dark attenuation, photosensitivity, and the like in accordance with not only the type of coordinated metal but also its crystal form (Sawada, M., Japanese Journal of "DYES and CHEMICALS", vol. 24, No. 6, pages 122–128, 1979).

Regarding a dispersion stability of phthalocyanine pigment, on the other hand, it has been known that it depends on a particle size, a particle form, and a surface ξ-potential (Kumano, I. Denshi Shashin Gakkai-shi, pages 111–120, No. 2, vol. 22, 1984). In this case, the particle form and the quantum surface potential are also affected by various kinds of the crystal form (i.e., habit) depending on the extent of a growth of crystallographically equivalent surfaces. Therefore, it is very important to develop a crystal particle having a habit suitable for providing an excellent electrical characteristics and an excellent dispersion stability. Conventionally, it has been possible to develop phthalocyanine crystals having crystal forms for providing good electrical characteristics but habits suitable for providing dispersion stabilities.

In the case of the same materials having different habits, by the way, it is possible to distinguish between the two by means of external forms of their crystals. However, they can be distinguished more precisely by making a comparison between their patterns of X-ray diffraction spectra to be obtained by performing a X-ray powder method or the like.

That is, the process includes the steps of obtaining a X-ray diffraction spectrum of each crystal sample and making a comparison between their diffraction intensities with respect to each angle of diffraction.

As listed in Table 1 below, the titanylphthalocyanine crystals are classified into several structure types in accordance with their X-ray diffraction spectra, and also their lattice constants are determined by means of the structure analysis.

TABLE 1

| Crystal type | Lattice constant | Reference |
|---|---|---|
| α | Phase II | JP61-217050<br>JP61-239348<br>JP62-134651 |
| I | Phase I | JP62-67094 |
| II | | JP62-67094 |
| A | Phase I | JP63-364,<br>JP63-366 |
| B | Phase II | JP63-364,<br>JP63-366 |
| C | | JP63-364,<br>JP63-366 |
| m | C | JP63-198067 |
| amorphous | | JP1-123868 |

FIGS. 1 to 4 are X-ray diffraction spectra of titanyloxyphthalocyanine crystals in the types of I, IT, α, and amorphous, respectively. That is, FIG. 1 is an X-ray diffraction spectrum of titanyloxyphthalocyanine crystal (type I)

described in Japanese Patent Application Laying-open No. 62-67094; FIG. 2 is an X-ray diffraction spectrum of titanyloxyphthalocyanine crystal (type II) described in Japanese Patent Application Laying-open No.62-67094; FIG. 3 is an X-ray diffraction spectrum of titanyloxyphthalocyanine crystal (type α) described in Japanese Patent Application Laying-open No.62-134651; and FIG. 4 is an X-ray diffraction spectrum of amorphous titanyloxyphthalocyanine crystal.

Regarding the above lattice constants listed in Table 1, phase II type crystals are grouped in triclinic crystals, while phase I and C type crystals are grouped in monoclinic crystals.

The above clarification is also explained in Journal of Imaging Science and Technology, 605–609, vol. 37, No. 6, 1993.

Furthermore, there is another way for classifying titanyloxyphthalocyanine crystals in accordance with Bragg angles and intensities in their X-ray diffraction spectra. That is, they are classified into the following four groups.

(1) Titanyloxyphthalocyanine crystals classified in a first group are thermodynamically stable and can be obtained immediately after their syntheses. The X-ray diffraction spectrum of each crystal is characterized by having the maximum intensity of diffraction at the Bragg angle (2θ) of 26.3°(±0.2°).

(2) Titanyloxyphthalocyanine crystals classified in a second group are such as crystals in the typeof II as disclosed in Japanese Patent Application Laying-open No. 62-67094. The X-ray diffraction spectrum of each crystal is characterized by having the maximum intensity of diffraction at a Bragg angle (2θ) of 27.3°(±0.2°).

(3) Titanyloxyphthalocyanine crystals classified in a third group are such as crystals in the type of a as disclosed in Japanese Patent Application Laying-open No. 61-217050. The X-ray diffraction spectrum of each crystal is characterized by having the maximum intensity of diffraction at a Bragg angle (2θ) of 7.5°(±0.2°).

(4) Titanyloxyphthalocyanine crystals classified in a fourth group are such as crystals disclosed in Japanese Patent Application Laying-open No. 5-320167. The X-ray diffraction spectrum of each crystal is characterized by having the peak intensities of diffraction at Bragg angles (2θ) of 9°, 5°, 14.1°, 17.8°, 27.1°, and 29.0° and the maximum intensity of diffraction at a Bragg angle (2θ) of 9.5°(±0.2°).

However, the titanyloxyphthalocyanines of the above groups have some disadvantages in practical use. That is, for example, the photoreceptor comprising one of them does not show a sufficient photo sensitivity against a beam of laser, a sufficient charging ability, a sufficient potential stability under the condition of recycling use; and a potential stability under the changes in use conditions.

In addition, there is another disadvantage of an insufficient dispersion stability when the above typed titanyloxyphthalocyanine crystal is used as a charge generation material to be dispersed in a solvent to prepare a coating solution. For that reason, in the case of forming charging generation layers by using the coating solution immediately after the dispersion or after passing times, the changes in electrophotographic characteristics of the resultant photoreceptors can be observed in spite of using the same coating condition. In this case, furthermore, there are other troubles such as an image noise to be caused by aggregated particles. As a result, it is very difficult to obtain an electrophotographic photoreceptor which is of good quality and of excellent characteristics in industrial and economical terms.

In general, by the way, a charge transport material preferable for a certain charge generation material is not always good for other charge generation materials. In addition, a charge generation material preferable for a certain charge transport material is not always good for other charge transport materials. That is, it means that there is an appropriate combination between them. Thus an inappropriate combination between them leads to several problems in practical use, such as insufficient sensitivities, low static electrification, and unstable electrical characteristics in repeat use of the photoreceptor.

As described above, the above combination is a matter of great importance to the photoreceptor. However, there is no definite theory concerned about the combination. Therefore the appropriate combination of the above materials has been investigated by way of experiment. It means that the appropriate combination of the charge generation material and the charge transport material have been hardly found.

In the case of the laminate-type photoreceptor, furthermore, there is an under-coating layer mainly consisting of a resin between the conductive layer and the photosensitive layer for preventing the injection of charge carriers from the conductive substrate. The reasons of applying the under-coating layer on the substrate is for forming a good photosensitive layer without causing unevenness thereof. That is, the under-coating layer covers defects of substrate's surface, such as an irregular shape, impurities and roughness thereof.

The resin to be used for the under-coating layer can be selected from the group of solvent-soluble polyamide, polyvinyl alcohol, polyvinyl butyral, casein, and so on. It is possible to prevent the injection of charge carriers by processing the resin into a thin film of under 0.5 μm in thickness. In general, however, the under-coating layer should be formed as a film of over 0.5 μm in thickness for covering a surface of the conductive substrate and forming a photoconductive layer without unevenness. As the case may be, the under-coating layer should be formed as a film of over 1 μm in thickness, for example in accordance with the conditions of processing the substrate and the conditions of impurities on the substrate's surface. However, if the resin layer is prepared as a thick film made of the above resin such as polyvinyl alcohol, polyvinyl butyral, and casein, it shows large electrical resistivity and high residual potential of the photoreceptor. In this case, furthermore, there is another problem of the big change in electrical properties of the photoreceptor under the condition of low temperature and low humidity or the condition of high temperature and high humidity because of the following reasons. That is, water-absorption properties of the resin layer is comparatively large and thus the water content thereof is largely changed in accordance with the surrounding conditions. In addition, the electrical conductivity of the resin layer is depend on the movement of $H^+$ ions and $OH^-$ ions to be generated by dissociating water molecules in the resin (i.e., ionic conductivity).

Currently, various materials have been proposed as an appropriate material to be used as an under-coating layer having low electric resistivity whether the layer is thick or not. For example, Japanese Patent Laying-open No. 2-193152, Japanese Patent Laying-open No. 3-288157, and Japanese Patent Laying-open No. 4-31870 disclose the specific resin structures of solvent-soluble polyamide resins. Japanese Patent Laying-open No. 3-145652, Japanese Patent Laying-open No. 3-81788, and Japanese Patent Laying-open No. 2-281262 disclose the mixtures of polyamide resin with other resins in expectation of reducing the effects of environmental changes by adjusting the electric resistance. However, these materials cannot avoid the effects of thermal and humidal conditions because of their compositions mainly including polyamide resin.

SUMMARY OF THE INVENTION

Therefore the first object of the present invention is to provide a novel titanyloxyphthalocyanine crystal having the electrical characteristics appropriate to electrophotography and showing an excellent dispersion stability and a sufficient sensitivity against the wavelengths of near infrared ray (i.e., about 700–800 nm) such as a semiconductor laser beam.

The second object of the present invention is to provide a method for preparing the novel titanyloxyphthalocyanine crystal.

The third object of the present invention is to provide an electrophotographic photoreceptor using the novel titanyloxyphthalocyanine crystal as a charge generation material, having an excellent electrical characteristics; a sufficient sensitivity against the wavelengths of near infrared ray, such as a semiconductor laser beam; the ability of forming an image without any defects in quality, such as image noise and unevenness of image concentration; and a sufficient durability to last of tens of thousands of cycles of the image formation to keep the stable electric characteristics and the stable image quality (i.e., cycle stability).

The fourth object of the present invention is to provide a charge transport material that works appropriately in combination with the above titanyloxyphthalocyanine.

The fifth object of the present invention is to provide an under-coating layer responsible for coating the charge generation layer mainly comprising the above titanyloxyphthalocyanine on a substrate without causing non uniform appearance of the resultant layer and for keeping the electrical resistance almost stable under the changes in surroundings.

In a first aspect of the present invention, there is a provided titanyloxyphthalocyanine crystal to be used as a charge generation material of an electrophotographic photoreceptor, having a maximum diffraction intensity observed at Bragg angle (2θ) of 9.6°±0.2° and clear peaks of diffraction intensity observed at 7.22°±0.2°, 9.60°±0.2°, 11.60°±0.2°, 13.40°±0.2°, 14.88°±0.2°, 18.34°±0.2°, 23.62°±0.2°, 24.14°±0.2°, and 27.32°±0.2°, respectively, in a X-ray diffraction spectrum obtained by performing a X-ray diffraction method using CuKα as a source of radiation.

In a second aspect of the present invention, there is provided an electrophotographic photoreceptor comprising a conductive substrate and a photosensitive layer including a charge generation material and a charge transport material, wherein the charge generation material is a titanyloxyphthalocyanine crystal having a maximum diffraction intensity observed at Bragg angle (2θ) of 9.6°±0.2° and clear peaks of diffraction intensity observed at 7.22°±0.2°, 9.60°±0.2°, 11.60°±0.2°, 13.40°±0.2°, 14.88°±0.2°, 18.34°±0.2°, 23.62°±0.2°, 24.14°±0.2°, and 27.32°±0.2°, respectively, in a X-ray diffraction spectrum obtained by performing a X-ray diffraction method using CuKα as a source of radiation.

Here, the photosensitive layer may be composed of a charge generation layer including the charge generation material and a charge transport layer including the charge transport layer.

The charge transport material may be a hydrazone compound.

The hydrazone compound way be represented by the formula [II]:

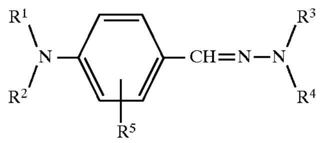

(II)

wherein $R^1$, $R^2$, $R^3$, and $R^4$ are groups selected from an alkyl group, an aralkyl group, and an aryl group, respectively, which may be substituted; and $R^5$ is an atom or a group selected from a hydrogen atom, a halogen atom, an alkyl group, and an alkoxy group, and $R^1$ and $R^2$ may be bound together to form a ring, and also $R^1$ or $R^2$ may be bound with $R^5$ to form a ring.

The charge transport material may be a distyryl compound.

The disytryl compound may be represented by the formula [III]

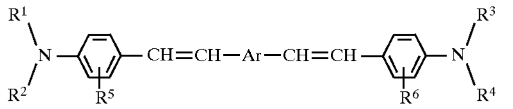

(III)

wherein $R^1$, $R^2$, $R^3$, and $R^4$ are groups selected from an alkyl group and an aryl group, respectively, which may be substituted; $R^5$ is an atom or a group selected from a hydrogen atom, a halogen atom, an alkyl group, and an alkoxy group, and Ar is an aryl group or an aromatic heterocyclic group.

An under-coating layer may be formed between the conductive substrate and the photosensitive layer.

The under-coating layer may be a hardened film mainly comprising melamine resin, aromatic carboxylic acid and or aromatic carboxylic anhydride, and iodine being fixed thereon.

In a third aspect of the present invention, there is provided a method for preparing a titanyloxyphthalocyanine to be used as a charge generation material of an electrophotographic receptor, comprising the steps of:

- dispersing a predetermined amount of amorphous titanyloxyphthalocyanine in which an aqueous solution in which ionic substances are dissolved, under mechanical force at a temperature of under 50° C., to obtain a mixture comprising fine dispersions;
- adding a non-aqueous organic solvent to the mixture to shift a dispersion of titanyloxyphthalocyanine from an aqueous phase to a non-aqueous organic solvent phase;
- removing the non-aqueous organic solvent phase to obtain a pellet of titanyloxyphthalocyanine crystal that has a maximum diffraction intensity observed at Bragg angle (2θ) of 9.60°±0.2° and clear peaks of diffraction intensity observed at 7.22°±0.2°, 9.60°±0.2°, 11.60°±0.2°, 13.40°±0.2°, 14.88°±0.2°, 18.34°±0.2°, 23.62°±0.2°, 24.14°±0.2°, and 27.32°±0.2°, respectively, in a X-ray diffraction spectrum obtained by performing a X-ray diffraction method using CuKα as a source of radiation.

In a fourth aspect of the present invention, there is provided a titanyloxyphthalocyanine crystal to be used as a charge generation layer of an electrophotoconductive photoreceptor, having a lattice constant of:

a=16.3058 Å, b=23.078 Å, c=8.7155 Å,

α=101.352°, β23.078°, and γ=117.530°, with an allowable error of ±1%.

In a fifth aspect of the present invention, there is provided an electrophotographic photoreceptor comprising a conductive substrate and a photosensitive layer including a charge generation material and a charge transport material, wherein the charge generation material is a titanyloxyphthalocyanine crystal having a lattice constant of:

a=16.3058 Å, b=23.078 Å, c=8.7155 Å,

α=101.352°, β-23.078°, and γ=117.530°, with an allowable error of ±1%.

Here, the photosensitive layer may be composed of a charge generation layer including the charge generation material and a charge transport layer including the charge transport layer.

The charge transport material may be a hydrazone compound.

The hydrazone compound may be represented by the formula [II]:

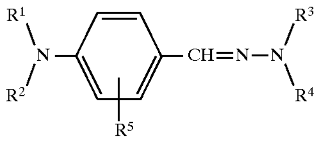

(II)

wherein $R^1$, $R^2$, $R^3$, and $R^4$ are groups selected from an alkyl group, an aralkyl group, and an aryl group, respectively, which may be substituted; and $R^5$ is an atom or a group selected from a hydrogen atom, a halogen atom, an alkyl group, and an alkoxy group, and $R^1$ and $R^2$ may be bound together to form a ring, and also $R^1$ or $R^2$ may be bound with $R^5$ to form a ring.

The charge transport material may be a distyryl compound.

The disytryl compound may be represented by the formula [III]:

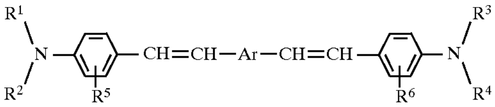

(III)

wherein $R^1$, $R^2$, $R^3$, and $R^4$ are groups selected from an alkyl group and an aryl group, respectively, which may be substituted; $R^5$ is an atom or a group selected from a hydrogen atom, a halogen atom, an alkyl group, and an alkoxy group, and Ar is an aryl group or an aromatic heterocyclic group.

An under-coating layer may be formed between the conductive substrate and the photosensitive layer.

The under-coating layer may be a hardened film mainly comprising melamine resin, aromatic carboxylic acid and/or aromatic carboxylic anhydride, and iodine being fixed thereon.

In a sixth aspect of the present invention, there is provided a method for preparing a titanyloxyphthalocyanine crystal to be used as a charge generation material of an electrophotographic photoreceptor, comprising the steps of:

dispersing a predetermined amount of amorphous titanyloxyphthalocyanine in which an aqueous solution in which ionic substances are dissolved, under mechanical force at a temperature of under 50° C., to obtain a mixture comprising fine dispersions;

adding a non-aqueous organic solvent to the mixture to shift a dispersion of titanyloxyphthalocyanine from an aqueous phase to a non-aqueous organic solvent phase;

removing the non-aqueous organic solvent phase to obtain a pellet of titanyloxyhthalocyanine crystal that has a lattice constant of:

a=16.3058 Å, b=23.078 Å, c=8.7155 Å,

α=101.352°, β-23.078°, and γ=117.530°, with an allowable error of ±1%.

The above and other objects, effects, features, and advantages of the present invention will become apparent from the following description of embodiments thereof taken in conjunction with the accompanying drawings.

DETAILED DESCRIPTION OF THE PREFERRED EMBODIMENTS

Figure 5:
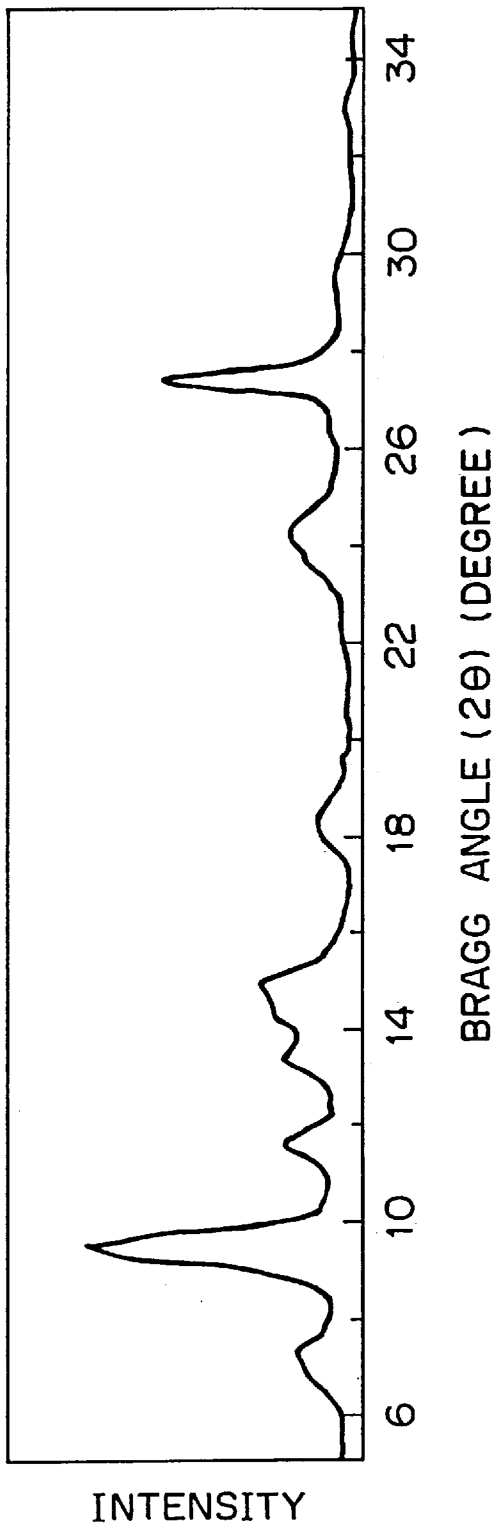
FIG. 5 is a pattern of an X-ray diffraction spectrum of titanyloxyphthalocyanine crystal in accordance with the present invention.

FIG. 5 shows a x-ray diffraction spectrum of titanyloxyphthalocyanine crystal in accordance with the present invention As shown in the figure, the titanyloxyphthalocyanine crystal has the maximum diffraction intensity observed at Bragg angle (2θ) of 9.6°±0.2° and clear peaks of diffraction intensity observed at 7.22°±0.2°, 9.60°±0.2°, 11.60°±0.2°, 13.40°±0.2°, 14.88°±0.2°, 18.34°±0.2°, 23.62°±0.2°, 24.14°±0.2°, and 27.32°±0.2°, respectively, in a X-ray diffraction spectrum obtained by performing a X-ray diffraction method using CuKα as a source of radiation. This spectrum pattern has something in common with the X-ray diffraction spectrum pattern of titanyloxyphthalocyanine crystal (corresponding to the fourth group described above) disclosed in the official gazette of Japanese Patent Application Laying-open No. 5-320167. However, they are not coincide with each other even if we give careful consideration to their permitted errors (2θ±0.2°). Consequently, the titanyloxyphthalocyanine crystal of the present invention must be a novel one. Furthermore, a result of the structural analysis using X-ray indicates that the titanyloxyphthalocyanine crystal of the present invention is classified as a triclinic crystal having a lattice constant of:

a=16.3058 Å, b=23.078 Å, c=8.7155 Å,

α=101.352°, β=23.078°, and γ=117.530°, with an allowable error of ±1%.

This kind of the lattice constant is completely different from that of the conventional titanyloxyphthalocyanine crystal.

A structure of the titanyloxyphthalocyanine in accordance with the present invention is represented by the general formula (I) below.

(I)

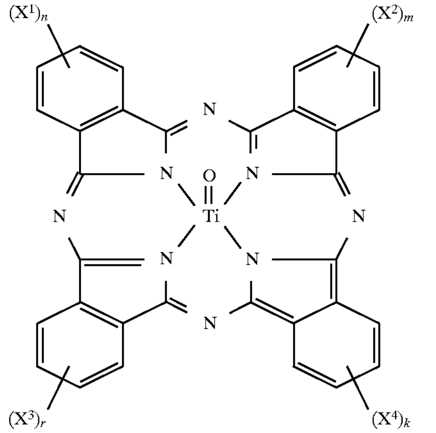

wherein $X^1$, $X^2$, $X^3$, and $X^4$ and x stand for Cl or Br, n, m, 1, and k stand for one of integral numbers from 0 to 4.

The titanyloxyphthalocyanine crystal of the present invention can be prepared by the method as described below.

To begin with, a titanium compound is reacted with o-phthalodinitryl, amino-imino-isoindorenin, or alkoxy-imino-isoindorenin in an inactive solvent having a high-melting point, such as α-chloronaphthalene or the like. The reaction is performed at the temperature of 160° C. to 300° C., preferably in general 160° C. to 260° C.

The titanium compound can be selected from the group of titanium halides such as titanium tetrachloride, titanium tetrachloride, and titanium tetrabromide. Especially, titanium tetrachloride is preferably used in terms of cost-effectiveness. When the titanium halide such as titanium tetrachloride ($TiCl_4$) is used as a reaction agent, however, the reaction can be progressed in accordance with the following formula.

$$\text{First step: phthalonitryl} + TiCl_4 \xrightarrow[\text{Inert solvent}]{160^\circ\text{ C.–}300^\circ\text{ C.}} PcTiCl_2$$

$$\text{Second step: } PcTiCl_2 \longrightarrow \text{(hydrolysis)} \longrightarrow PcTi{=}O$$

The above process will be explained in more detail for the case of using titanium halide as a titanium compound.

For the process, the above inert solvent with a high boiling point can be selected from dichlorobenzene, trichlorobenzene, α-chloronaphthalene, diphenyl ether, α-methyl naphtalene, methoxy naphtalene, diphenylethane, ethyleneglcyol alkylether, quinoline, and the like.

In general, a reaction temperature is in the range of 160° C. to 300° C., preferably 180° C. to 250° C. After the reaction, dichlorotitanium phthalocyanine thus obtained is separated by means of filtration and then washed with the same solvent to remove impurities generated by the reaction and unreacted raw materials.

It is preferable to treat the obtained dichlorotitanium phthalocyanine with one of the solvent selected from the alcohol group including methanol, ethanol, isopropyl alcohol, and the like; an ether group including tetrahydrofuran, dioxane, and the like; and an amide group including dimethylformamide, N-methyl-2-pyrolidone, and the like; and an electron donate solvent such as sulfolane, dimethyl sufoxide, morpholine, and pyridine.

Next, the dichlorotitanium phthalocyanine is hydrolyzed by a heat treatment in an aqueous solution, resulting in titanyloxyphthalocyanine. It is preferable to perform further steps for purifying the titanyloxyphthalocyanine in high purity. The purification can be performed by one of the conventional methods, for example, a cleaning method, a re-crystallization method, an extraction method such as Soxhlet method, and a thermal suspension. It is also possible to purify the titanyloxyphthalocyanine by means of sublimation or the like. It is noted that the above purification is not limited to one of the above methods, it is also possible to use other methods for eliminating unreacted raw materials, reaction by-products, and impurities.

The titanyloxyphthalocyanine is dispersed or solved in concentrated sulfuric acid at a temperature of under 5° C. Then the mixture is poured into a large amount of water being cooled at under room temperature. Precipitated titanyloxyphthalocyanine is filtrated and washed by an excess amount of water so as to become neutral. After washing, the titanyloxyphthalocyanine is dried.

The obtained titanyloxyphthalocyanine is subjected to the X-ray diffraction analysis and its resultant X-ray diffraction spectrum is like that of the amorphous material of a small degree of crystallization without showing any clear peak of diffraction.

Furthermore, the titanyloxyphthalocyanine is dispersed and microparticlized in an aqueous solution containing solved ionic materials at a temperature of under 50° C., preferably under 30° C., in the presence of mechanical force such as deformation force, shear force, and impulsive force. Then a nonaqueous organic solvent is added into the mixture and subjected to the mechanical force to shift the titanyloxyphthalocyanine dispersed in the aqueous phase to the nonaqueous phase so as to remove water.

The resultant titanyloxyphthalocyanine in the form of paste is washed by a hydrophilic solvent such as methanol and acetone for dissolving the above organic solvent. Finally, the resultant titanyloxyphthalocyanine is washed by water to remove ionic materials and then dried to obtain a crystallized titanyloxyphthalocyanine of the present invention. The resultant crystal can be easily dispersed in an aqueous solution and shows excellent electrophotographic properties.

By the way, the above ionic materials to be used are those of which can be solved in water to become ions and provide the water an electrical conduction. Therefore, the materials can be selected from inorganic or organic materials. For example, the inorganic materials are sodium chloride, salt cake, silicate of soda, potassium chloride, and the like, while the organic materials are carboxylic acid compounds, quaternarized amine compounds, or the like. However, it is preferable to use the inorganic material in consideration of cost effectiveness, simple purification, and the like.

Furthermore, the above nonaqueous organic solvent can be selected from the compounds of straight-chain aliphatic hydrocarbon, branched-chain aliphatic hydrocarbon, cyclic hydrocarbon, and aromatic hydrocarbon. These compounds may be of having substituted group such as nitrile and halogen.

The device to be used for applying the above mechanical force can be selected from the conventional mills or mixing devices, such as attriter, ball mill, high-speed mixer, banbary mixer, spec mixer, roller mill, three rollers, nanomizer, stamping mill, planet mill, vibrating mill, and kneader. In addition, a dispersion medium can be optionally used for applying the above mechanical force and selected from glass bead, steel bead, zirconia bead, aluminum bead, zirconia ball, flint stone, and the like.

Figure 6:
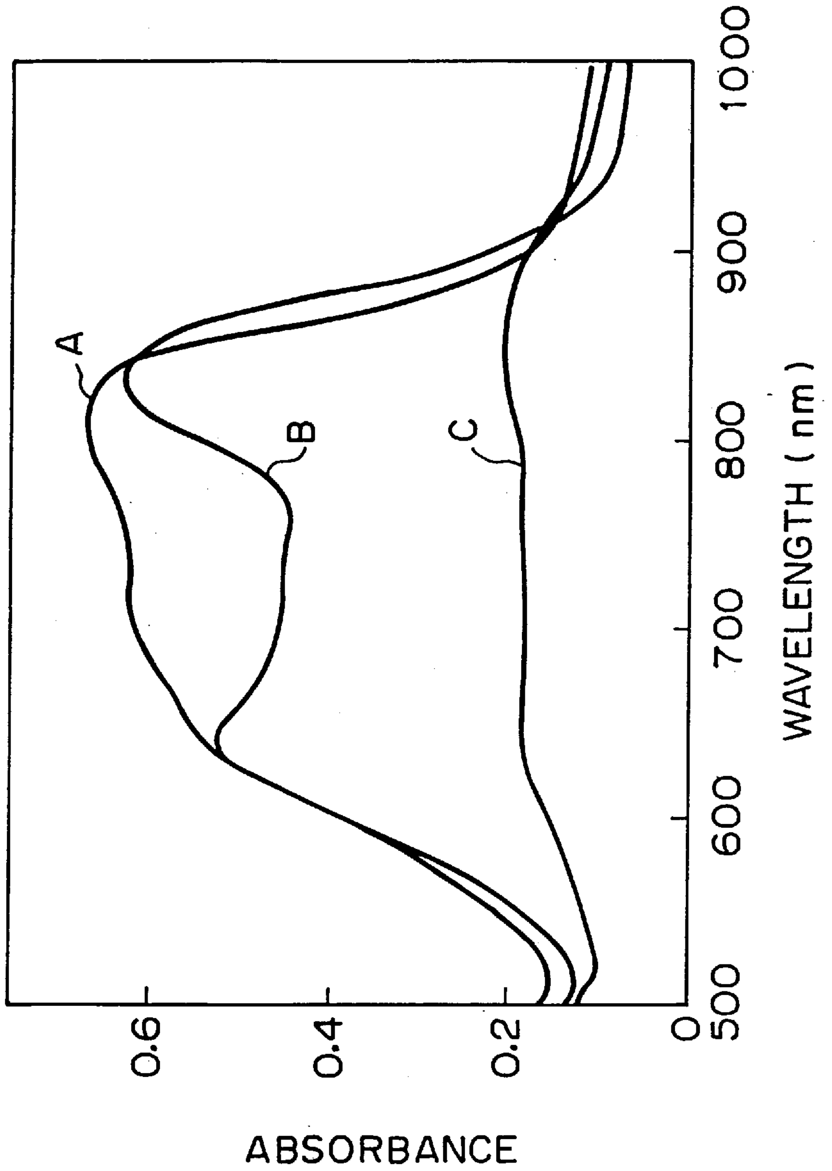
FIG. 6 shows a pattern of a X-ray diffraction spectrum of titanyloxyphthalocyanine crystal in accordance with the present invention, a pattern of an X-ray diffraction spectrum of I-type titanyloxyphthalocyanine crystal, and a pattern of an X-ray diffraction spectrum of α-type titanyloxyphthalocyanine crystal.

The titanyloxyphthalocyanine crystal in accordance with the present invention has a spectrum of light absorption as shown in FIG. 6. In this figure, the curve A indicates a spectrum of titanyloxyphthalocyanine crystal in accordance with the present invention, the curve B indicates a spectrum of α-type titanyloxyphthalocyanine as a comparative example, and the curve C indicates a spectrum of I-type titanyloxyphthalocyanine as another comparative example. Comparing with the I-type titanyloxyhthalocyanine (C), as shown in the figure, the titanyloxyphthalocyanine of the present invention (A) shows excellent properties of light-absorption at the wavelengths of ultra-violet ray region to near infrared ray region. The present titanyloxyphthalocyanine crystal (A) is also superior than the α-type crystal (B) and shows excellent properties of light absorption at the wavelengths of up to 820 nm or over. Therefore, it is possible to obtain an electrophotographic photoreceptor appropriate to absorb light at the wavelengths of near-infrared lay (e.g., a semiconductor laser beam).

Besides, the titanyloxyphthalocyanine crystal has an excellent dispersion stability because it is very stable in a coating solution for preparing a charge-generation layer and is hard to aggregate or precipitate therein. Therefore an electrophotographic photoreceptor can be prepared without causing microscopic uniformity of layers to be caused by inhomogeneous dispersion of charge-generation materials or the presence of aggregated large-sized charge-generation materials. Furthermore, the coating solution is stable with time, so that there is no need to change the coating solution with time to obtain a layer having a stable quality. Therefore, the process for preparing the electrophotographic photoreceptor becomes more simple. In addition, it is noted that the resultant photoreceptor provides an image without generating noise and unevenness.

Accordingly, the electrophotographic photoreceptor has excellent properties of static electrification and photosensitivity, and also these characteristics can be stable in repeat use.

Figure 7:
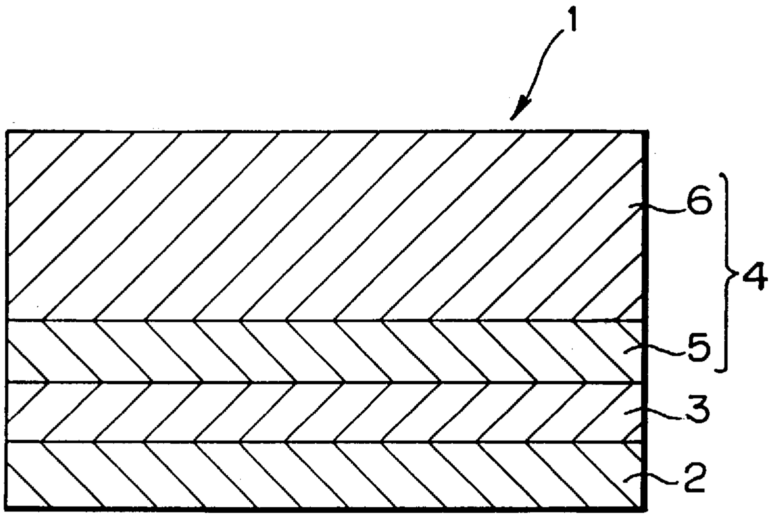
FIG. 7 is a schematic cross-sectional view of one of the preferred embodiments of the electrophotographic photoreceptor in accordance with the present invention.

FIG. 7 is a preferred embodiment of the electrophotographic photoreceptor in accordance with the present invention. The electrophotographic photoreceptor 1 is in the type of having functionally distinguishable layers. That is, an under-coating layer 3 is formed on an electroconductive substrate 2 and then a charge generation layer 5 and a charge transport layer 6 are stacked on the under-coating layer 3 in that order to form a photosensitive layer 4. By the way, the present invention is not limited to the type of having functionally distinguishable layers but also possible to the type of having a single layer that performs both steps of generating and transporting charges.

In the present invention, the electroconductive substrate 2 is in the form of metallic dram or sheet made of aluminum, vanadium, nickel, copper, zinc, palladium, indium, tin, platinum, stainless steel, chromium, brass, or other metals; a sheet of plastic material on which one of the above metals is deposited or laminated; or a plastic drum or a sheet of plastic material made of a dispersion of electroconductive material in an electroconductive or non-conductive plastic material. However, it is not limited to the above materials but also possible to use other materials to be charged. Also, it is not limited to the above forms but also possible to prepare the substrate 2 as in the shape of a plate, sheet, or cylinder.

The under-coating layer of the present invention is preferably provided as a harden membrane which is basically composed of at least one mixture selected from the group of: melamine resin and aromatic carboxylic acid and/or aromatic carboxylic acid anhydride; and melamine resin and aromatic carboxylic acid and/or aromatic carboxylic acid chloride, and iodine being fixed in the selected mixture.

The melamine resin of the present invention may be prepared by the following process. First of all, a methylol compound is obtained by reacting melamine with formaldehyde and then butyl etherified by reacting with alcohol.

The aromatic carboxylic acid, aromatic carboxylic acid anhydride, aromatic carboxylic acid chloride are terephthalic acid, isophthalic acid, phthalic anhydride, trimellitic acid, pyromellitic acid, pyromellitic anhydride, naphtalene caryboxylic acid, benzoic acid, and their ammonium chloride and sulfate.

A total amount of aromatic carboxyl acid to be mixed with melamine resin is in the range of 5 to 100 parts by weight with respect to 100 parts by weight of melamine resin. If the amount of the aromatic carboxylic acid is lower than 5 parts by weight, a hardness of the membrane is lowered, the membrane disorders such as swelling and melting are occurred when the charge generation layer is applied. If the amount of the aromatic carboxylic acid is in the range of over 100 parts by weight, a pot stability of the coating solution is lowered.

For the purpose of preventing a tan of the coating membrane, the under-coating layer may be further comprised of a filler to prevent a moire of the image to be caused by light reflected to the substrate. The filler can be selected from several compounds such as titanium oxide, aluminum oxide, kaolin, talc, and the silicon oxide.

It is preferable to use the above described harden film as an under-coating layer to be applied in the present invention. However, it is not limited to that film but also a film selected from:

- a film made of a metal oxide such as alumite;
- a film made of a film-formable high-molecular, for example one selected from polyamides such as nylon 6, nylon 66, nylon 11, nylon 610, copolymerized nylon, and alkoxymethylated nylon, or selected from casein, polyvinyl alcohol, ethylene acrylate copolymer, gelatin, and polyvinyl butyral; and
- a resin film with dispersed conductive-, semiconductive-, or dielectric particles made of metal oxide such as zinc oxide or titanium oxide, aluminum oxide, silicon nitride, silicon carbide, carbon black, or the like.

Accordingly, the electrophotographic photoreceptor of the present invention, which comprises a hardened film as an under-coating layer prepared in the presence of iodine, is superior to the conventional one that uses an under-coating layer prepared by solidifying melamine resin by mixing with amino resin and aromatic carboxylic acid and/or aromatic carboxylic anhydride, or aromatic carboxylic acid and/or aromatic carboxylic acid chloride, without presence of iodine. That is, the under-coating layer proposed in the present invention can be applied thickly on a substrate so as to enoughly cover the substrate for uniformly applying a charge generation layer thereon. In this case, the photoconductor thus obtained keeps its excellent electrophotographic properties under various environmental conditions whether the under-coating layer is formed as the extremely thick one (e.g., 10–20 μm in thickness) or not. Thus the electric properties of the under-coating layer can be hardly effected at all. That is, the charge potential and photo sensitivity do not fall, and also the residual potential does not rise after using the photoreceptor over and over. In addition, many inhomogeneous, shape-defective, rough, and impure regions formed on the surface of the photoconductive substrate can be covered with the under-coating layer so that the photosensitive layer can be formed so as to reduce the membrane defects and make it uniform throughout. In the case of the photoreceptor of the functionally deviated layer type in which the photosensitive layer is formed by laminating the charge transport layer on the charge generation layer, the charge generation layer can be easily formed as a thin film which is uniform throughout. Consequently, the photoreceptor for constantly providing images having excellent image qualities can be obtained, and also it is very rare to provide poor images with defects.

It has been known that an addition product formed by reacting nylon-6 with a large amount of iodine (i.e., 80–100%) acts as an electroconductive material having an extremely low resistance thereof (J. of Mat. Sci., 21. 604–610, 1986). Furthermore, polyvinyl alcohol, polytetrahydrofuran, and polyacrylonitrile can be reacted with iodine to form addition products having electroconductivities. As described above, however, the hardened film solidified by adding iodine in the mixture of melamine resin and aromatic carboxylic acid and/or aromatic carboxylic anhydride, or aromatic carboxylic acid and/or aromatic carboxylic acid chloride shows good conductivity by adding a small amount of iodine therein. In addition, the conductivity of the hardened film is almost kept at a constant under the various environmental conditions.

Consequently, the above hardened film works effectively when it is applied as an under-coating layer of the photoreceptor with a charge-generation layer comprising the novel titanyloxyphthalocyanine The charge generation layer 5 is formed by applying a coating solution on a surface of the under-coating layer formed on the substrate. The coating solution is prepared by dispersing and dissolving a charge generation material and a binding agent in a solvent. The titanylphthalocyanine crystal of the present invention can be used as the charge generation material, but not limited to used it alone. It is also possible to use other charging materials in combination with the titanylphthalocyanine. That is, the material can be selected from non-metal phthalocyanines in various crystal forms; various metal phthalocyanines in which a central metal of each of their phthalocyanine skeletons is iron, cobalt, nickel, aluminum, silicon, copper, titanium, vanadium, indium, gallium, germanium, magnesium, or the like; bis- and tri-azo compounds; anthraquinone compounds; perylene compounds; perinone compounds; azulenium chloride compounds; squaleum chloride compounds; pyrropyrrole compounds; and the like.

The binding agent to be preferably used in the present invention is selected from the group of hydrophobic high-molecular polymers or co-polymers that form high electrical insulating-films. To put it more concretely, the binder is made of at least one selected from the group of phenol resin, polyester resin, vinyl acetate compounds, polycarbonate resins, polypeptide resins, cellulose resins, polyvinyl pyrolidone, polyethylene oxide, polyvinyl chloride resin, polyvinylidene chloride resin, polystyrene resin, polyvinyl acetate, styrene-butadiene copolymer, vinylidene chloride—acrylonitrile copolymer, vinyl chloride—vinyl acetate copolymer, vinyl chloride—vinyl acetate—maleic anhydride copolymer, silicon—alkyd resin, phenol—formaldehyde resin, styrene-alkyd resin, polyvinyl alcohol, acrylic copolymer resin, methacryl copolymer resin, silicone resin, methacrylonitrile copolymer resin, polyvinyl butyral, polyvinylidene chloride resin, mixtures of these compounds, and the like. In general, a thickness of the charge generation layer is in the range of 0.01 $\mu$m to 5 $\mu$m.

The charge transport layer 6 is formed as a layer comprising a material with the ability of transporting charge carriers. For the material, a hydrazone compound or a distyryl compound can be used.

A preferable hydrazone compound is indicated by the general formula (II) below.

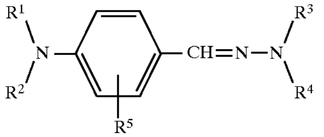
(II)

wherein $R^1$, $R^2$, $R^3$, and $R^4$ are groups selected from an alkyl group, an aralkyl group, and an aryl group, respectively, which may be substituted; and $R^5$ is an atom or a group selected from a hydrogen atom, a halogen atom, an alkyl group, and an alkoxy group.

In the formula (II), $R^1$ and $R^2$, may be bound together to form a ring, and also $R^1$ or $R^{2,}$ may be bound with $R^5$ to form a ring.

A preferable distyryl compound is indicated by the general formula (III) below.

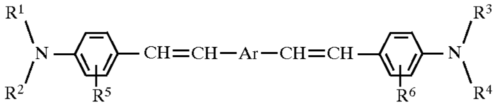
(III)

wherein $R^1$, $R^2$, $R^3$, and $R^4$ are groups selected from an alkyl group and an aryl group, respectively, which may be substituted; $R^5$ is an atom or a group selected from a hydrogen atom, a halogen atom, an alkyl group, and an alkoxy group, and Ar is an aryl group or an aromatic heterocyclic group.

Furthermore, the following general formulae (II-1) to (II-18) are concrete examples of the above hydrazone compound, while (III -1) to (III-96) are concrete examples of the above distyryl compound.

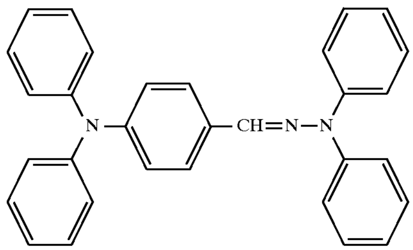
(II-1)

-continued
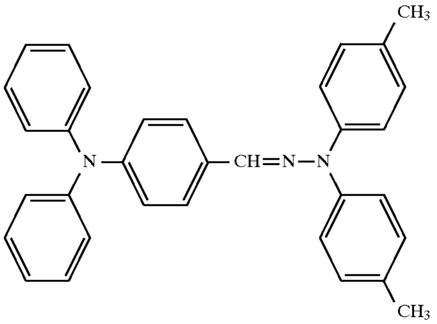
(II-2)
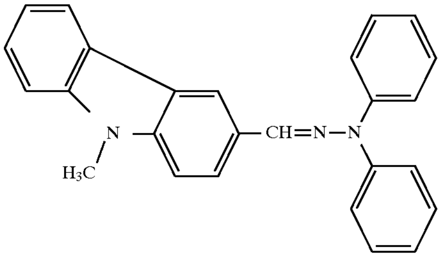
(II-3)
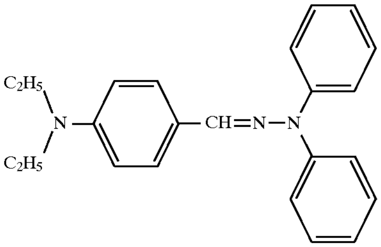
(II-4)
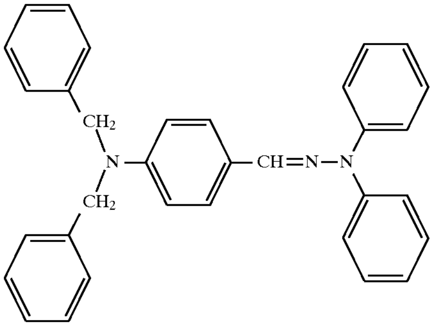
(II-5)
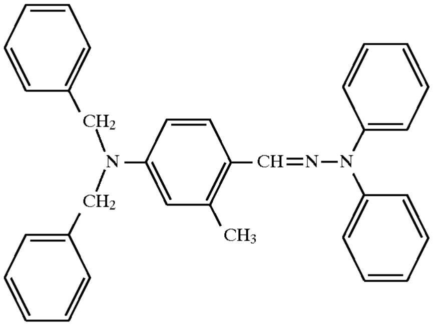
(II-6)

-continued
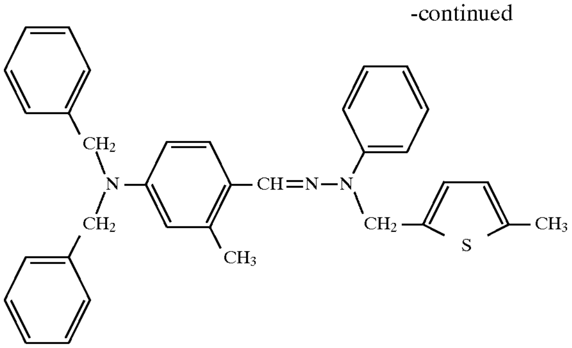
(II-7)
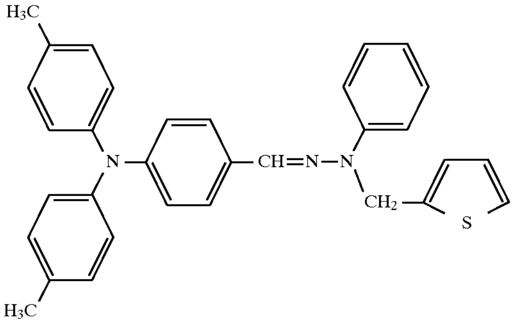
(II-8)
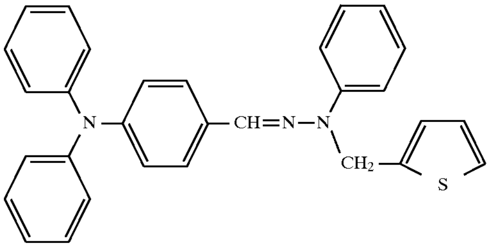
(II-9)
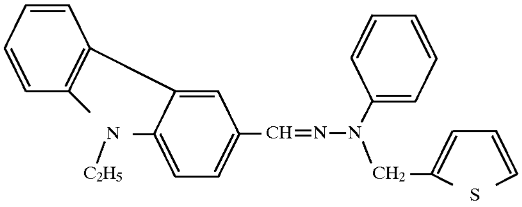
(II-10)
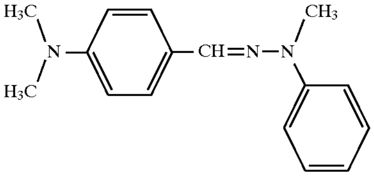
(II-11)
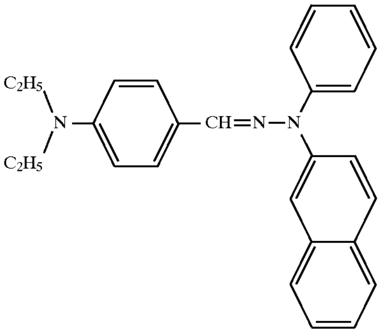
(II-12)

-continued
(II-13)
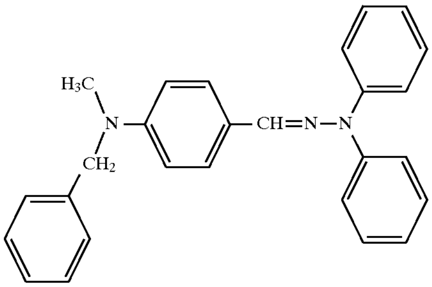
(II-14)
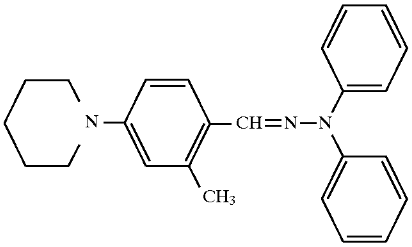
(II-15)
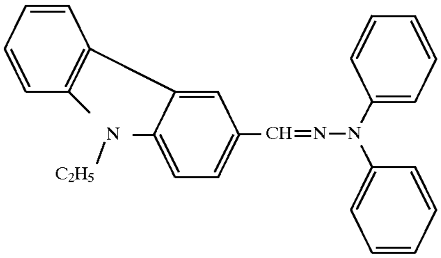
(II-16)
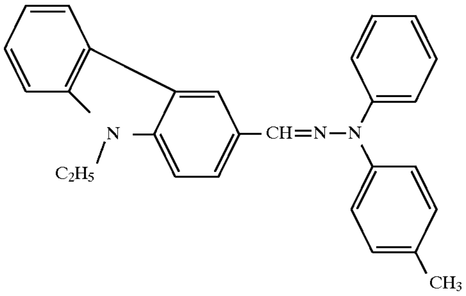
(II-17)
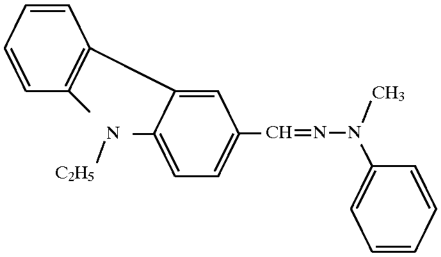

-continued
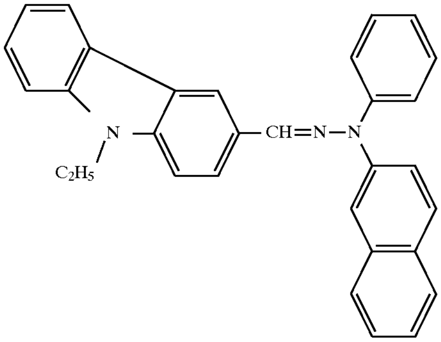
(II-18)
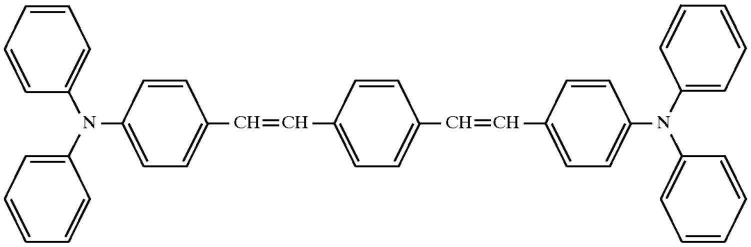
(III-1)
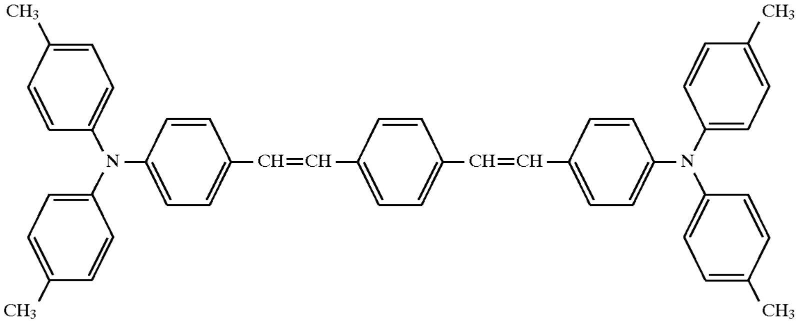
(III-2)
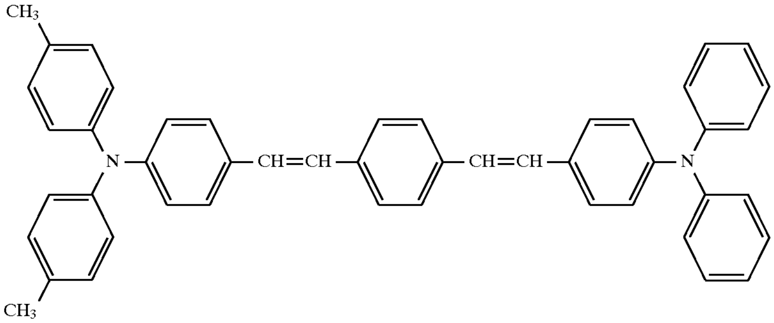
(III-3)
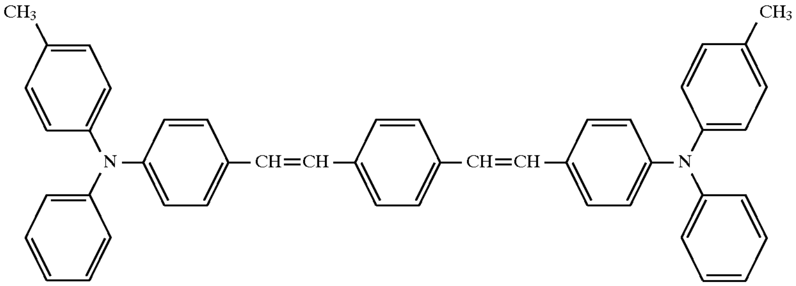
(III-4)

-continued
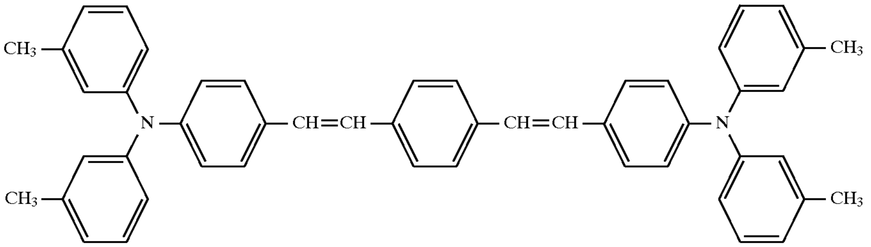
(III-5)
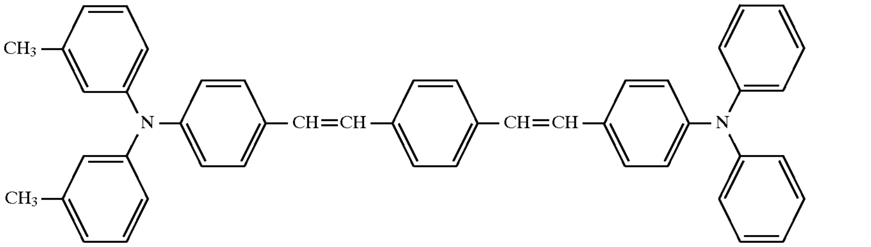
(III-6)
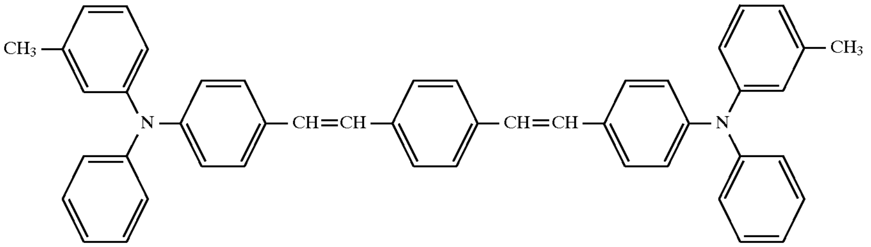
(III-7)
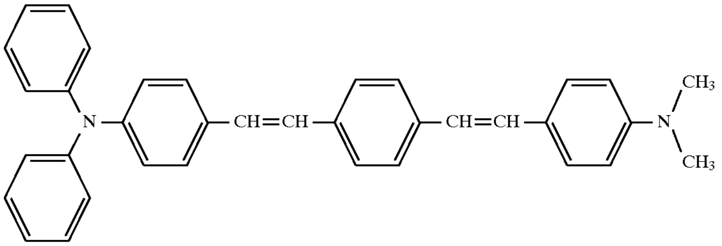
(III-8)
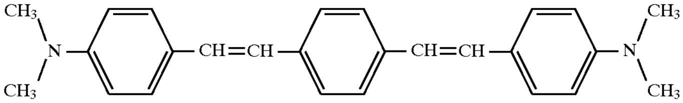
(III-9)
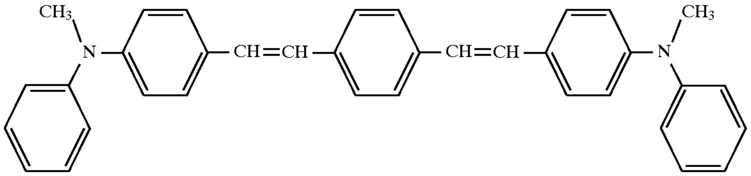
(III-10)
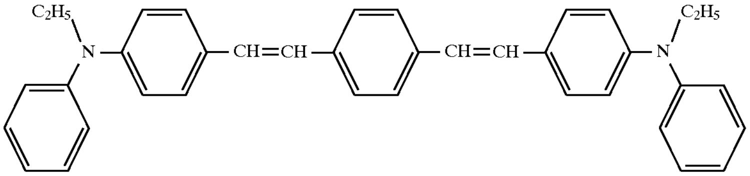
(III-11)
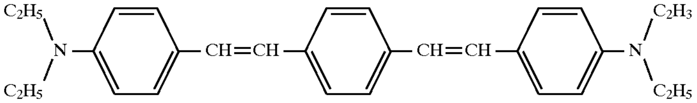
(III-12)

-continued
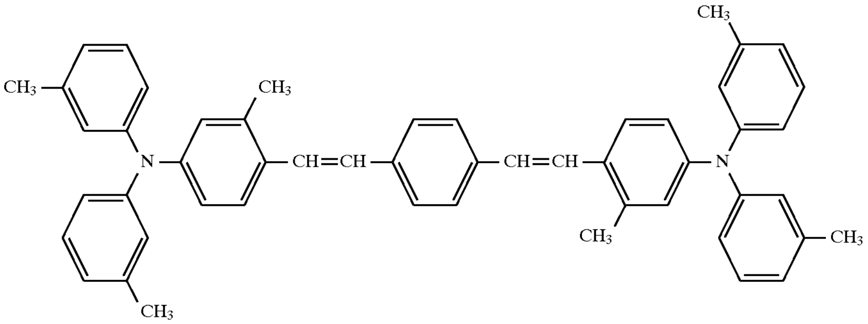
(III-13)
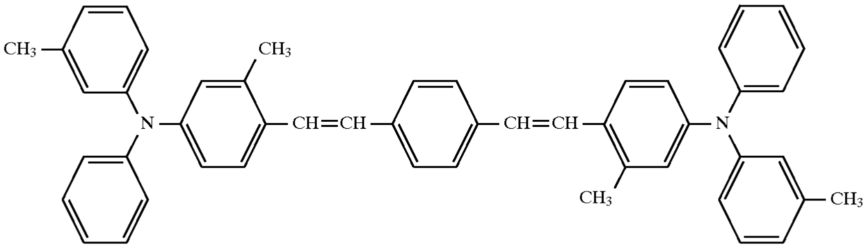
(III-14)
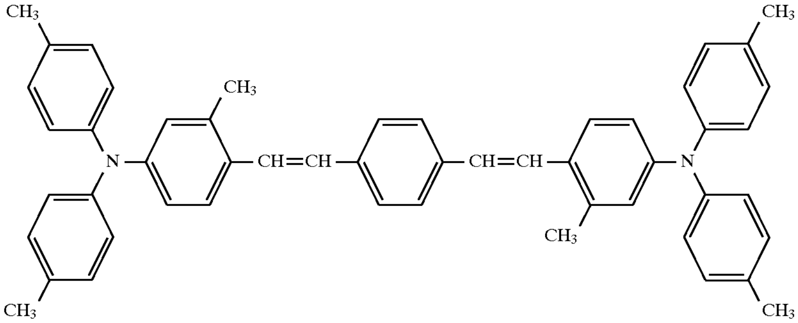
(III-15)
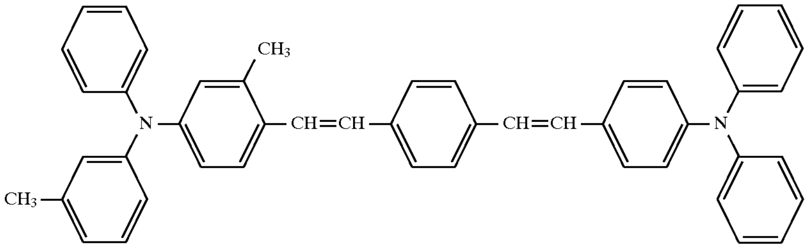
(III-16)
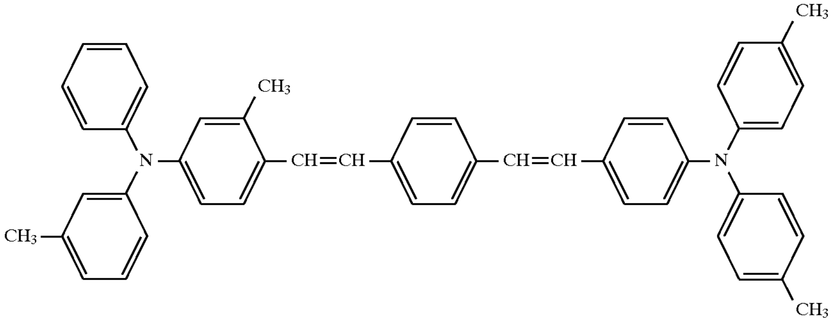
(III-17)

-continued
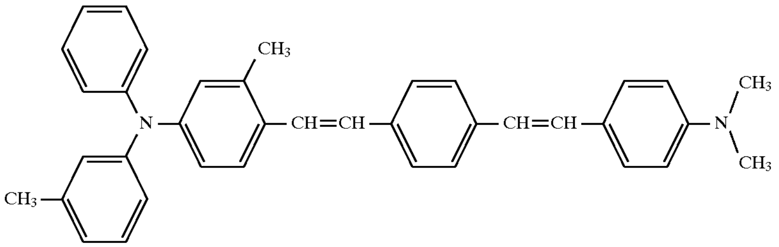
(III-18)
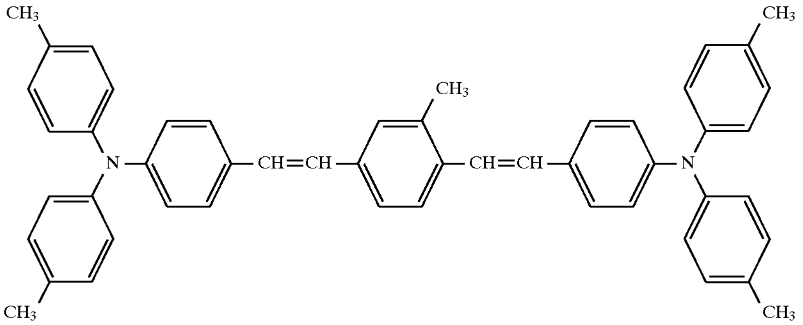
(III-19)
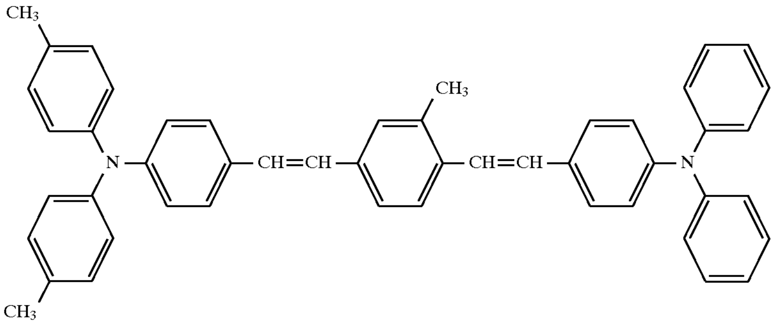
(III-20)
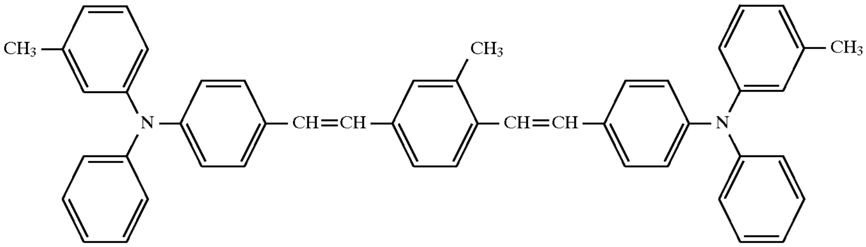
(III-21)
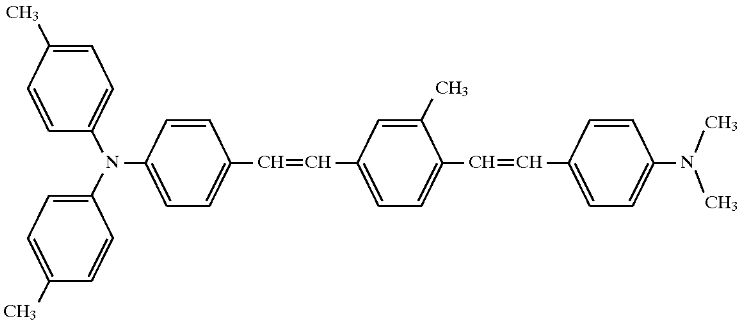
(III-22)

-continued
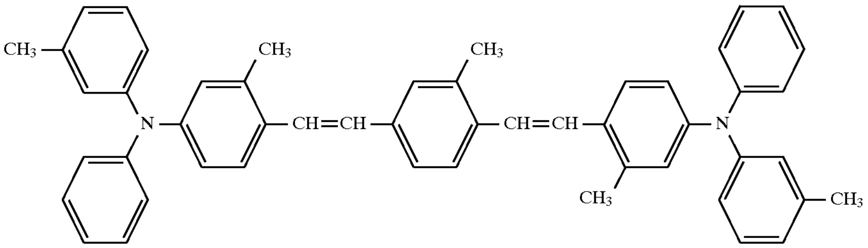
(III-23)
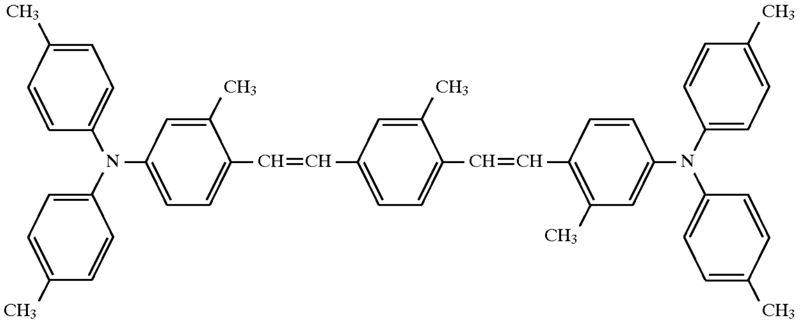
(III-24)
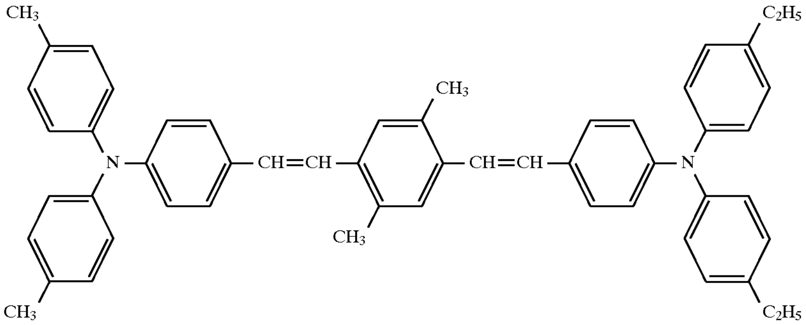
(III-25)
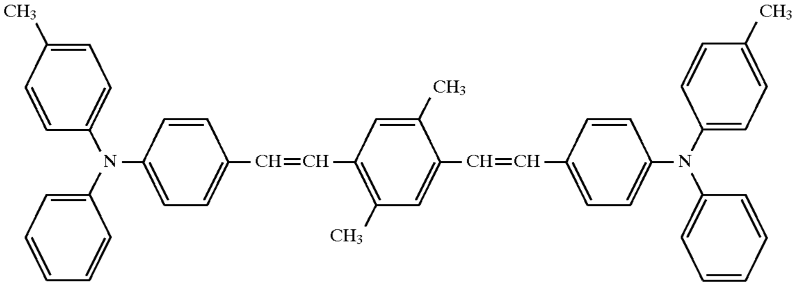
(III-26)
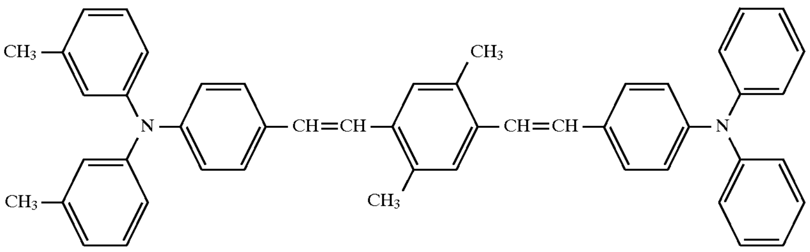
(III-27)

-continued
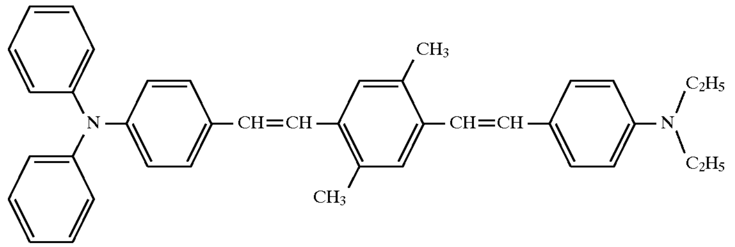
(III-28)
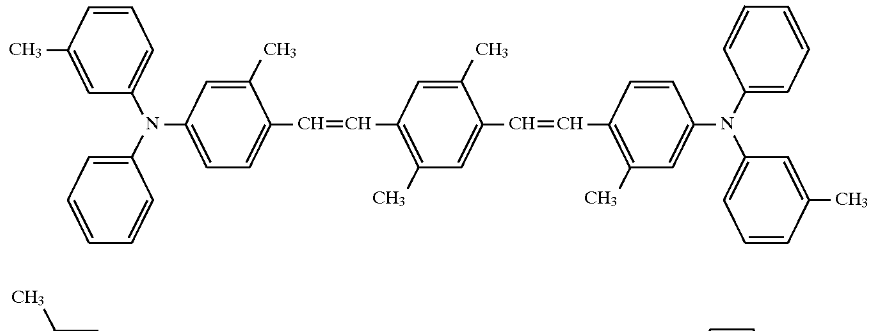
(III-29)
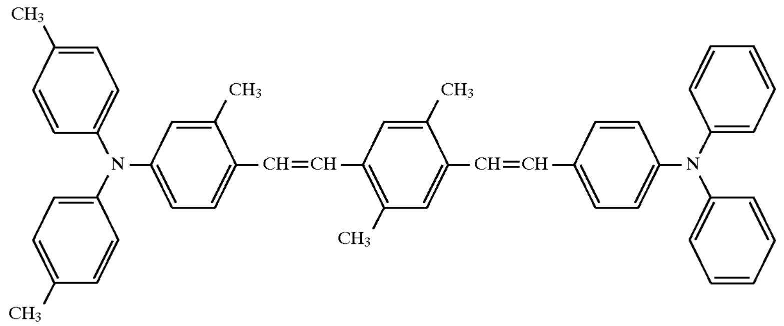
(III-30)
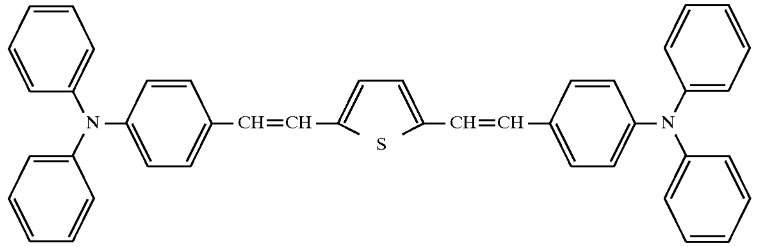
(III-31)
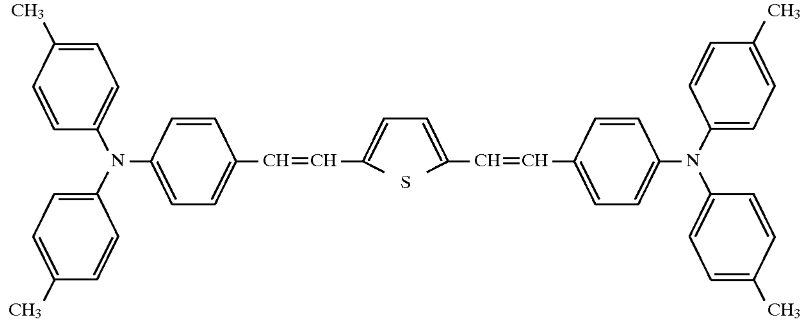
(III-32)

-continued
(III-33)
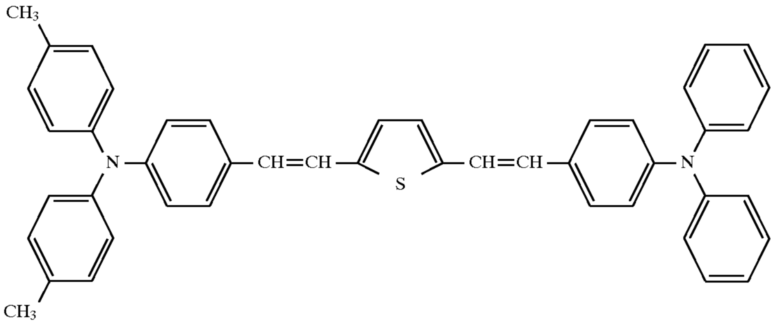
(III-34)
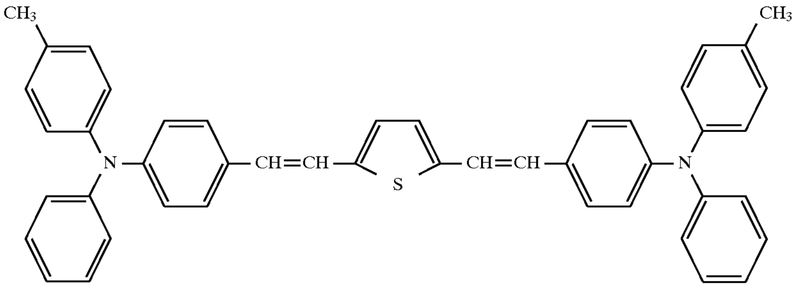
(III-35)
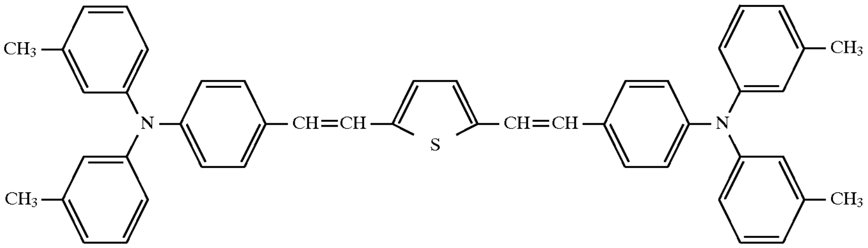
(III-36)
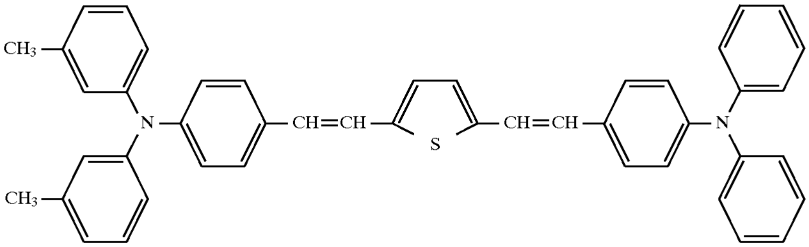
(III-37)
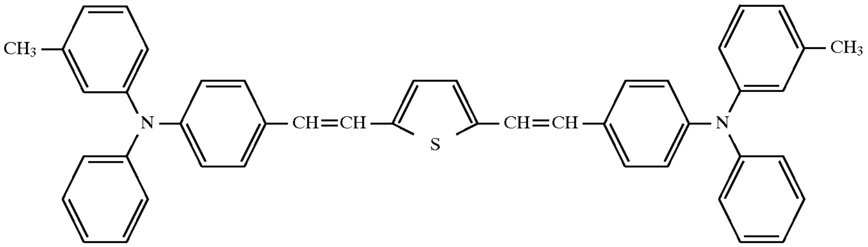
(III-38)
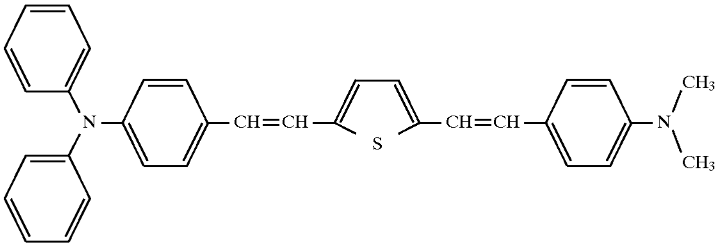

-continued
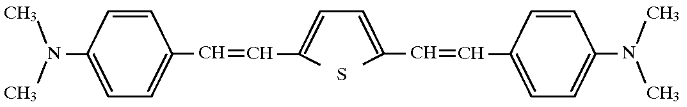
(III-39)
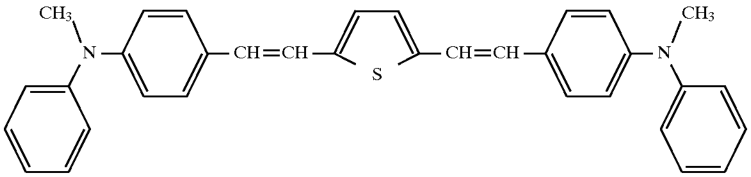
(III-40)
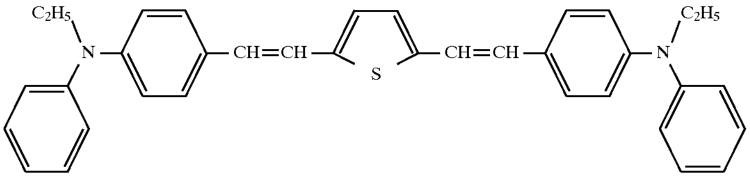
(III-41)
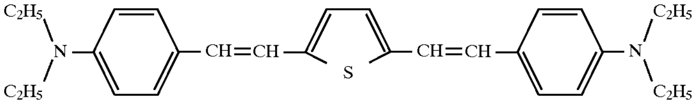
(III-42)
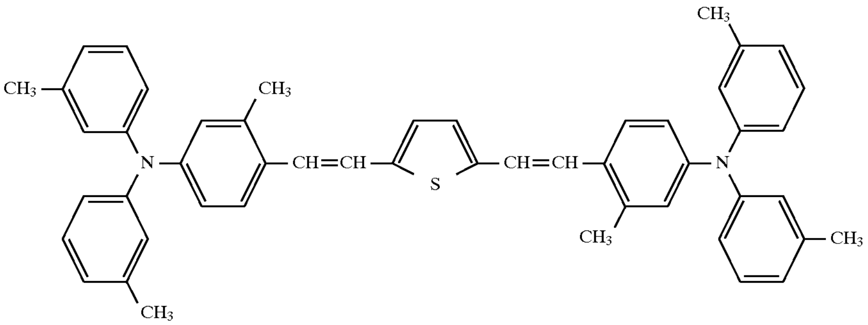
(III-43)
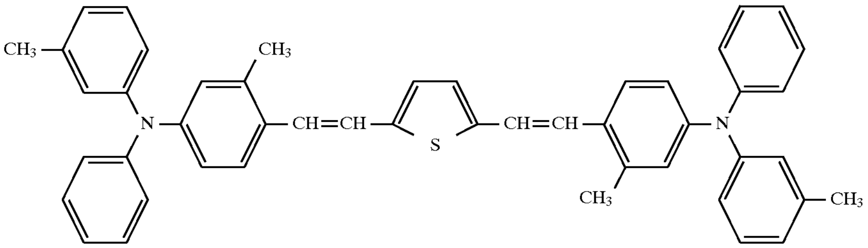
(III-44)
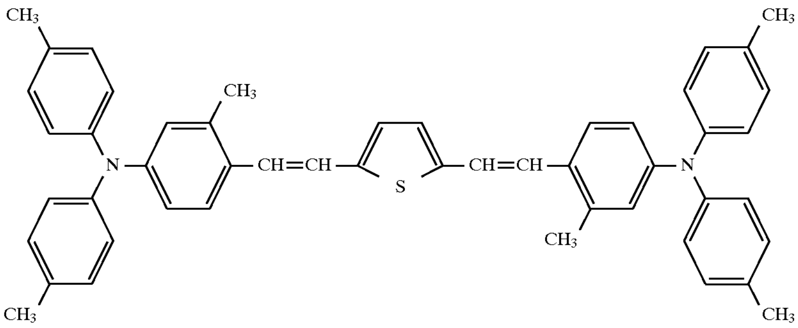
(III-45)

-continued
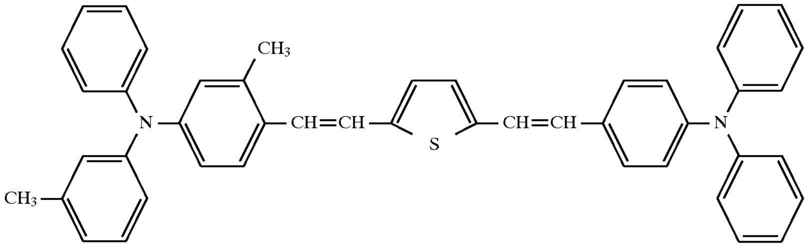
(III-46)
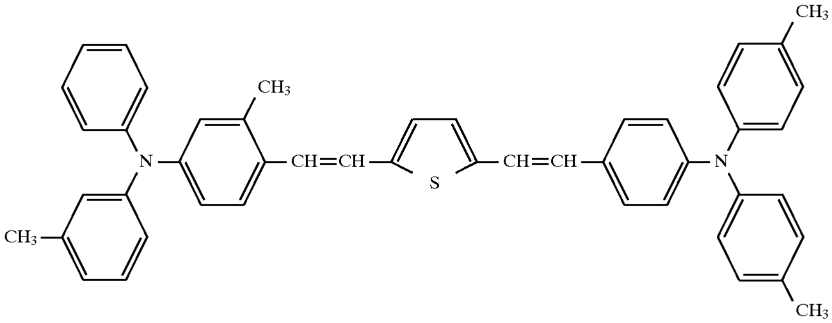
(III-47)
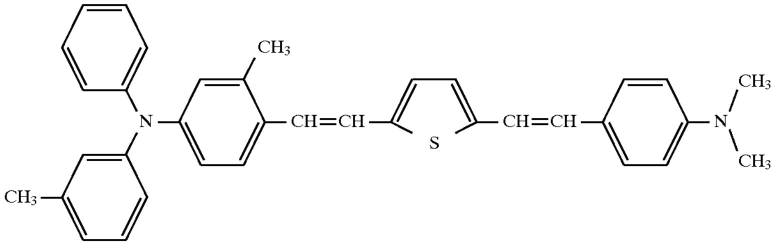
(III-48)
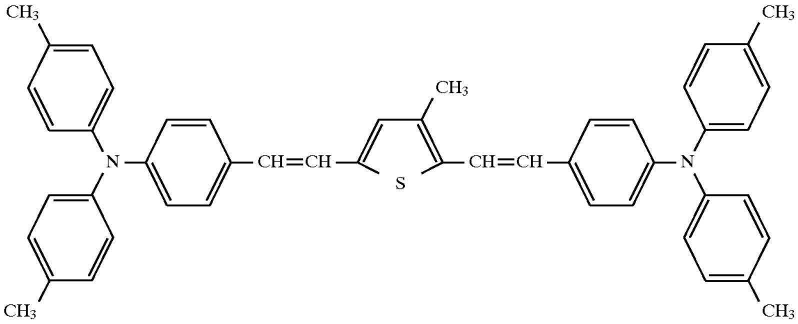
(III-49)
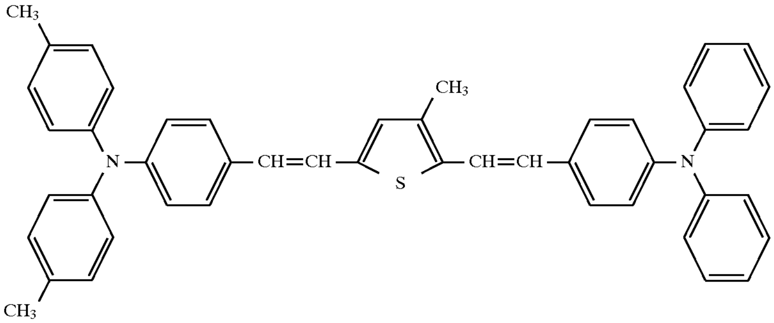
(III-50)

-continued
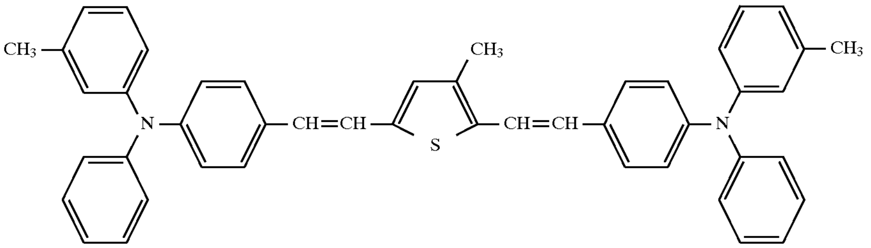
(III-51)
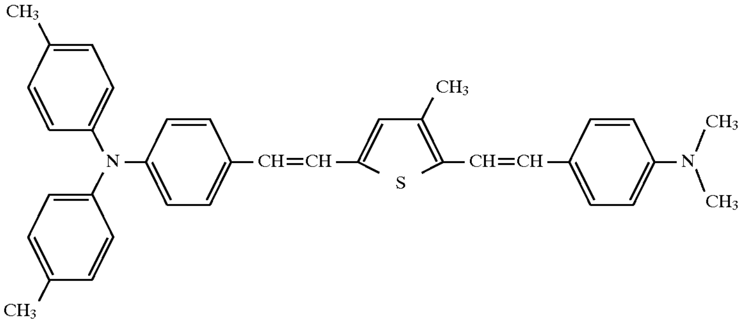
(III-52)
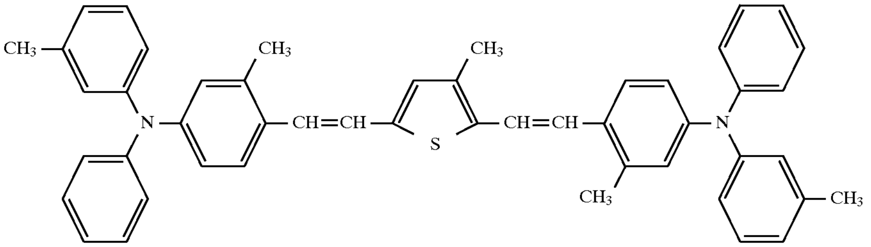
(III-53)
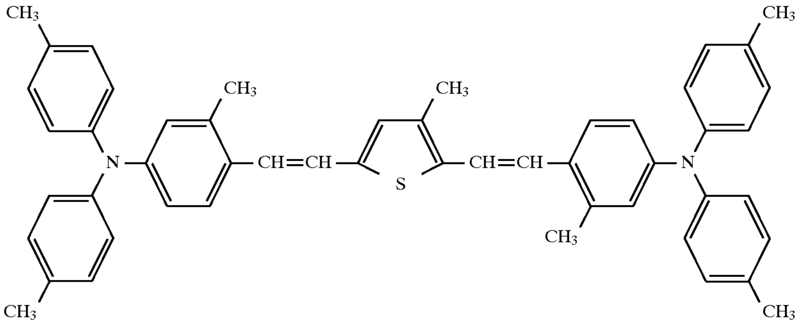
(III-54)
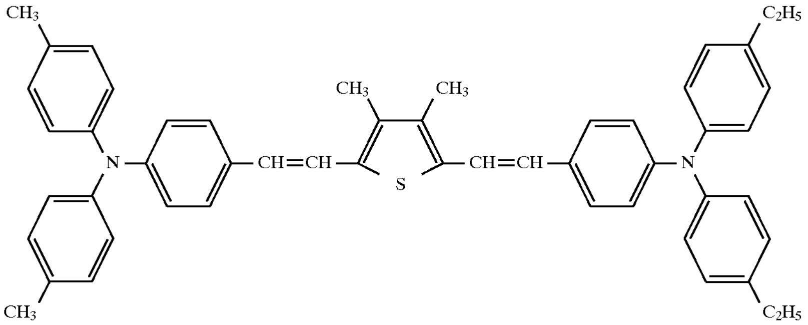
(III-55)

-continued
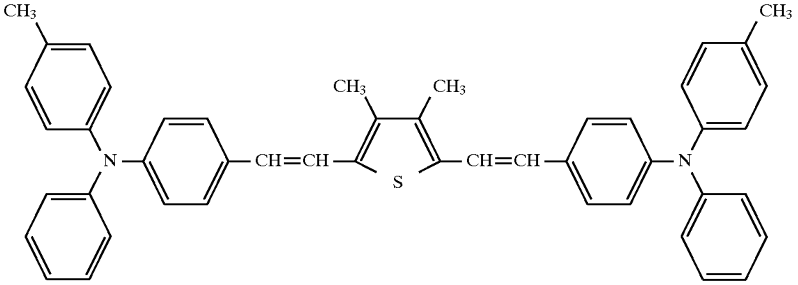
(III-56)
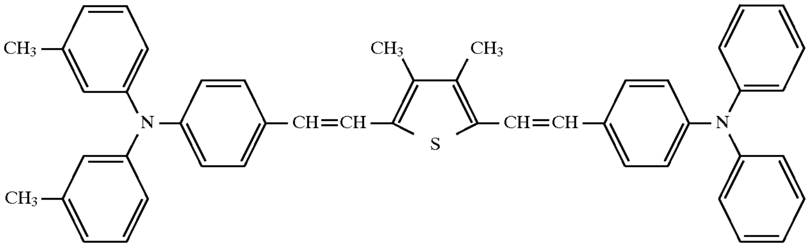
(III-57)
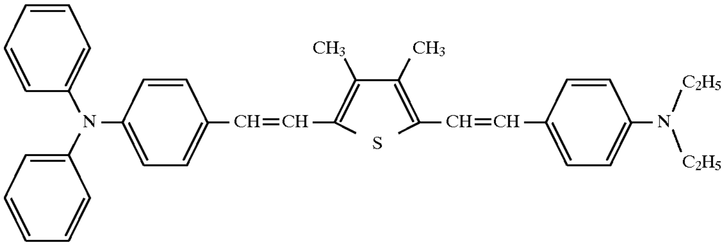
(III-58)
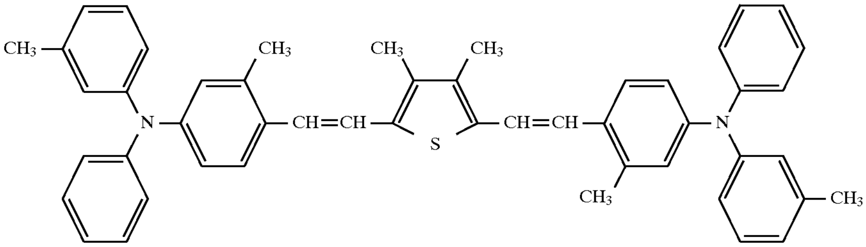
(III-59)
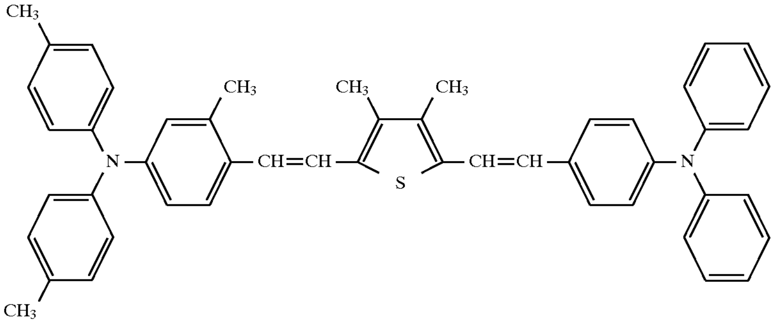
(III-60)
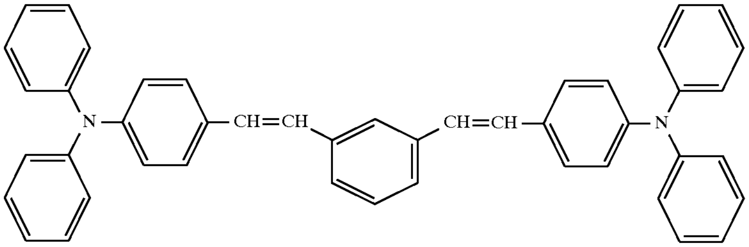
(III-61)

-continued
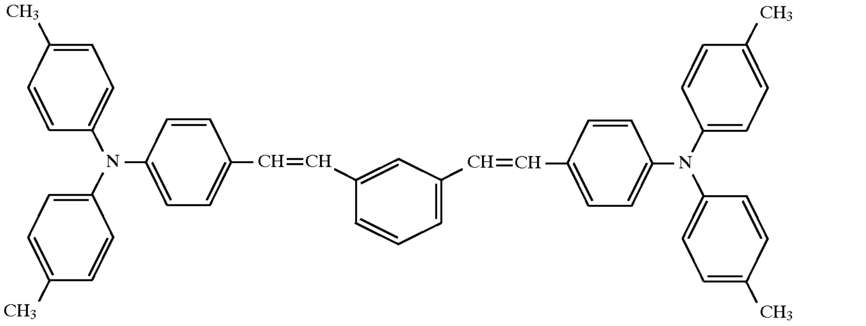
(III-62)
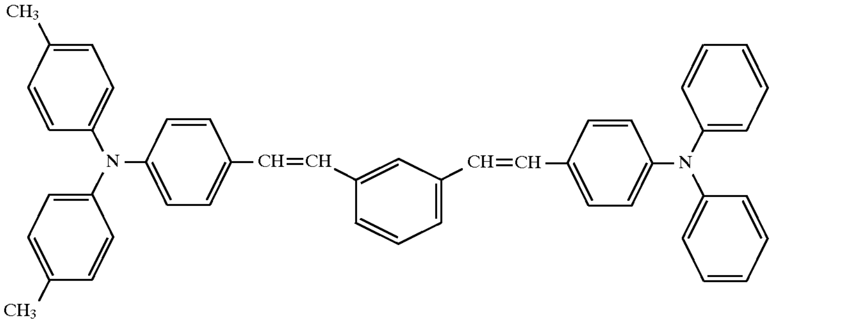
(III-63)
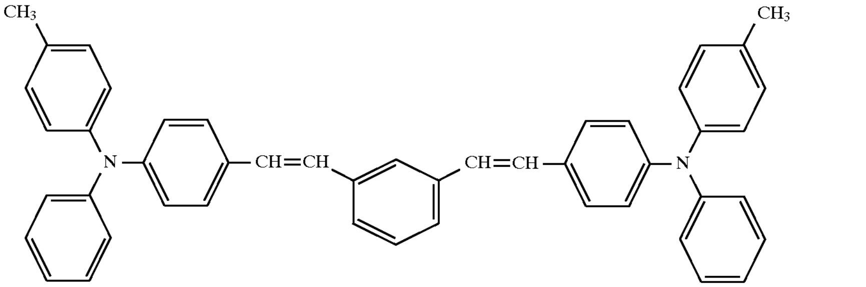
(III-64)
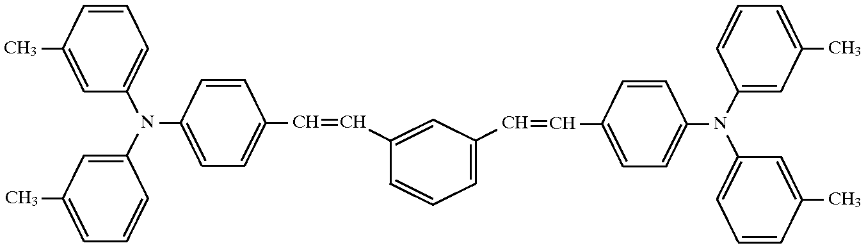
(III-65)
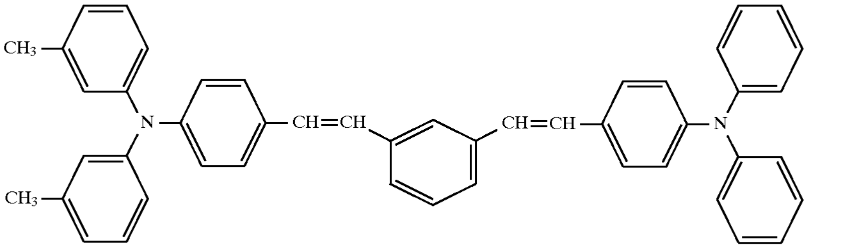
(III-66)

-continued
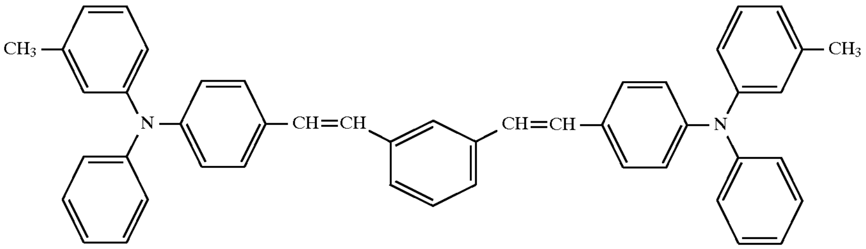
(III-67)
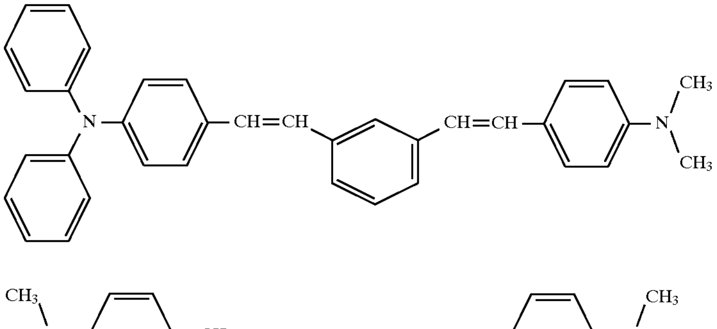
(III-68)
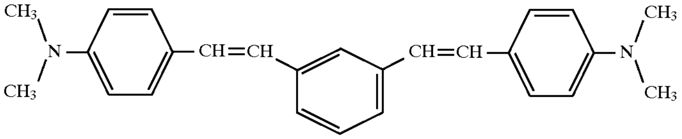
(III-69)
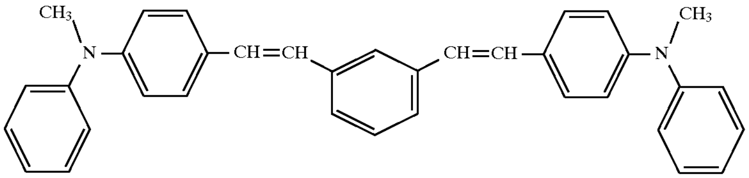
(III-70)
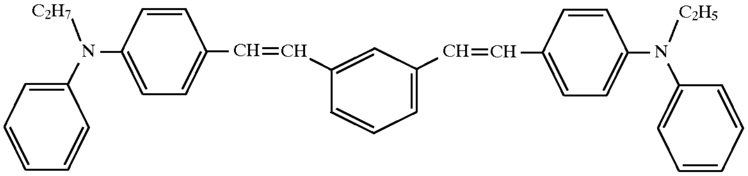
(III-71)
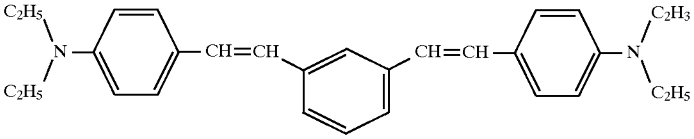
(III-72)
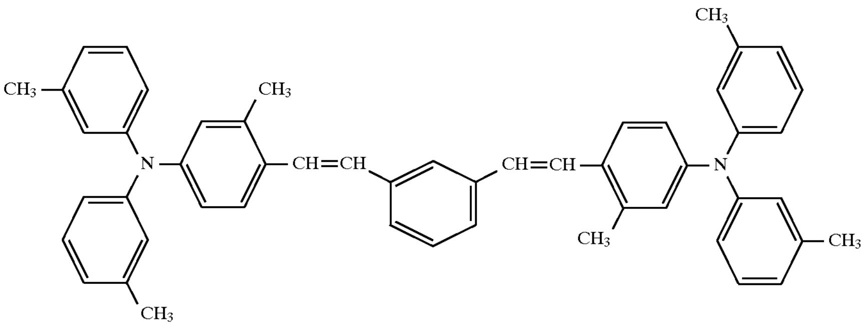
(III-73)

-continued
(III-74)
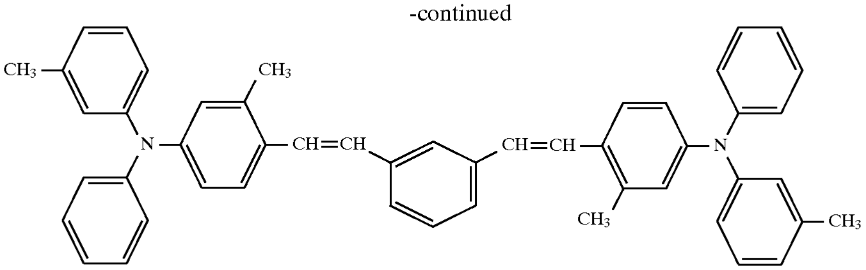
(III-75)
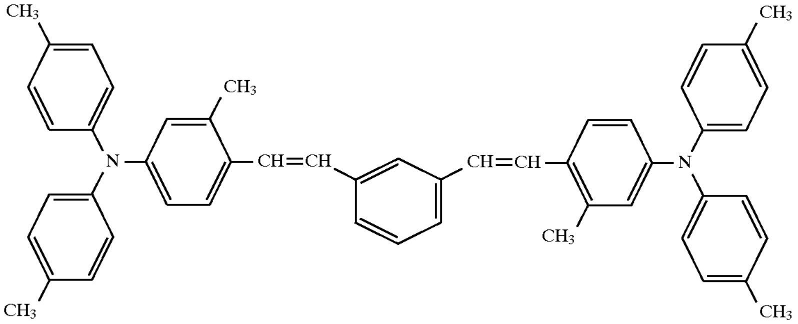
(III-76)
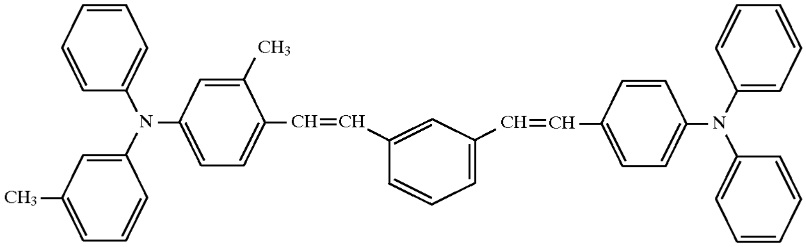
(III-77)
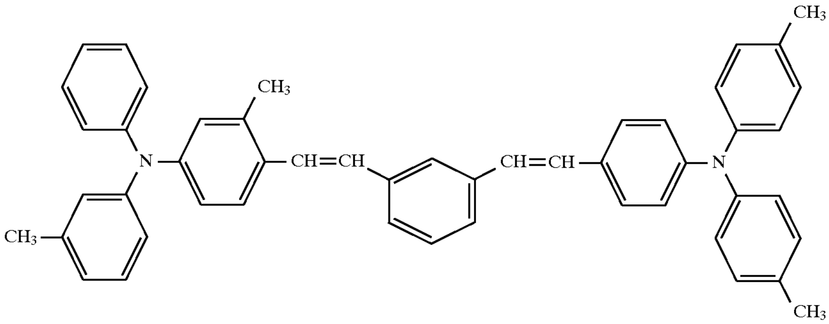
(III-78)
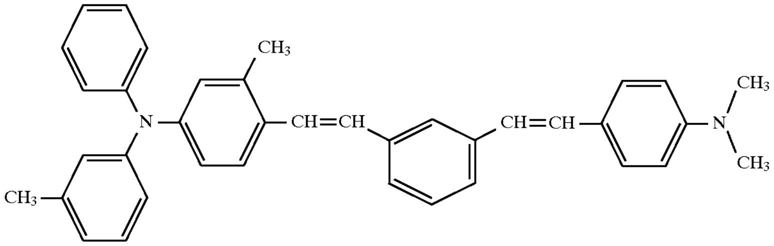
(III-79)
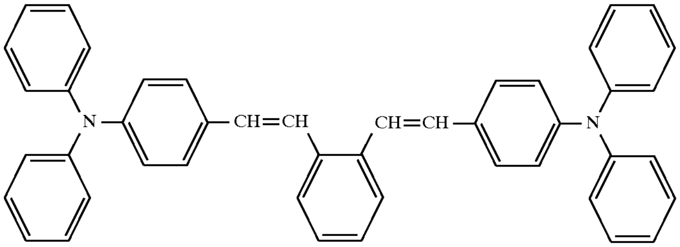

-continued
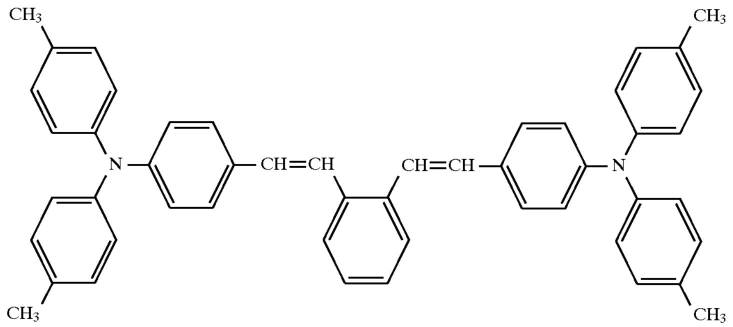
(III-80)
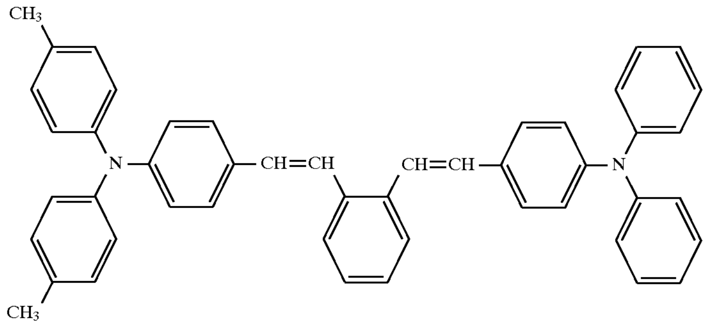
(III-81)
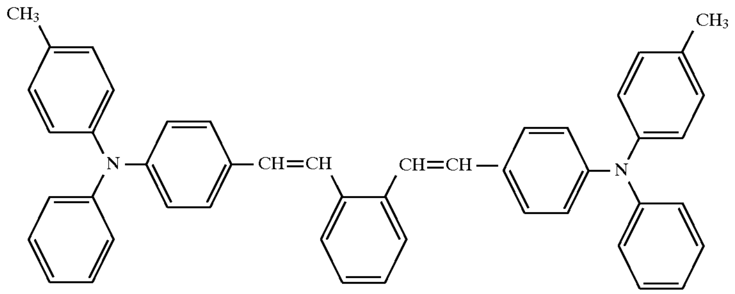
(III-82)
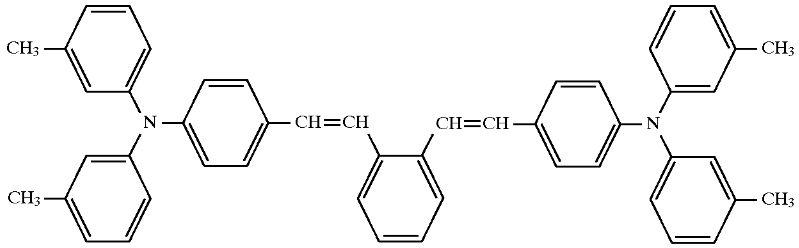
(III-83)
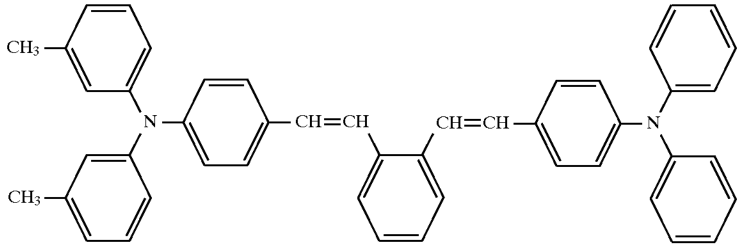
(III-84)

-continued
(III-85)
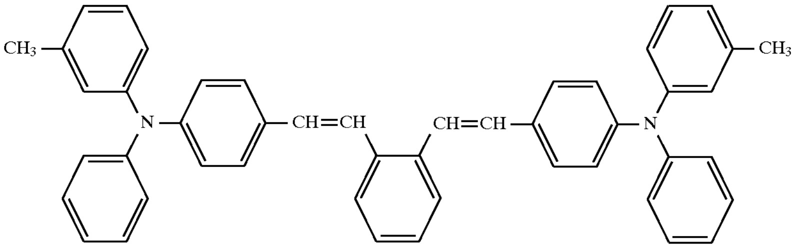
(III-86)
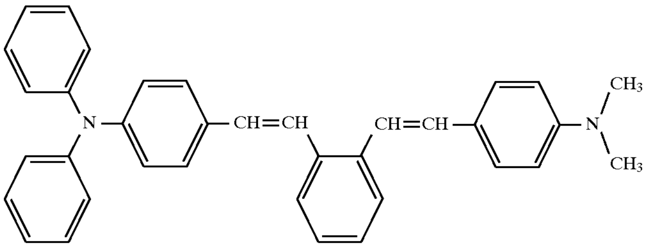
(III-87)
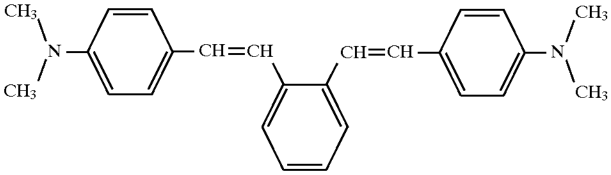
(III-88)
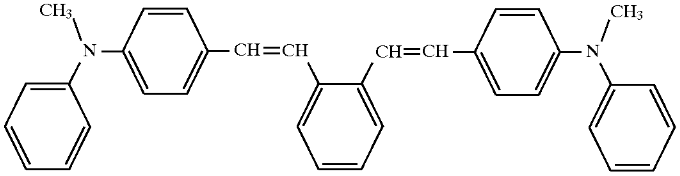
(III-89)
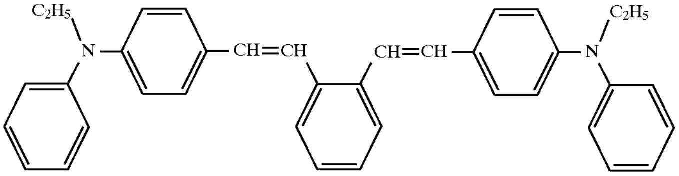
(III-90)
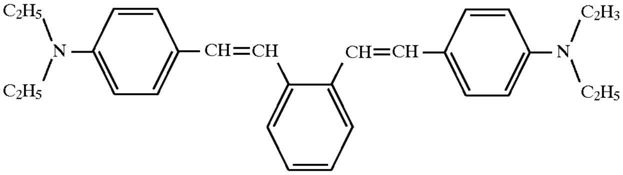
(III-91)
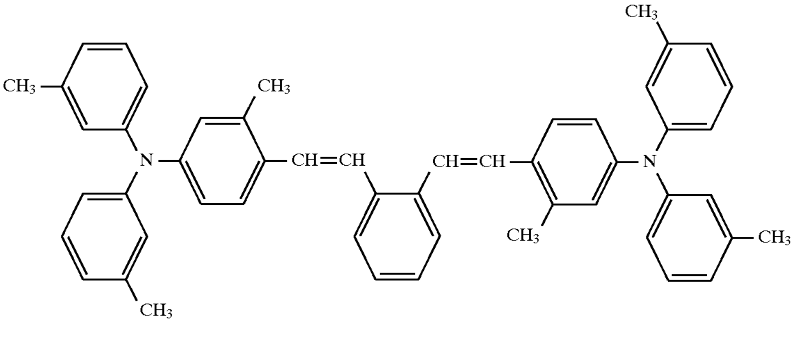

-continued

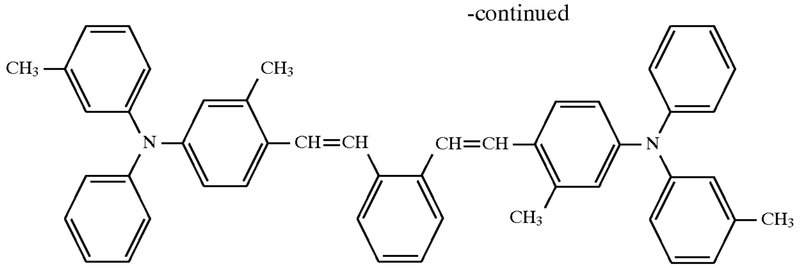

(III-92)

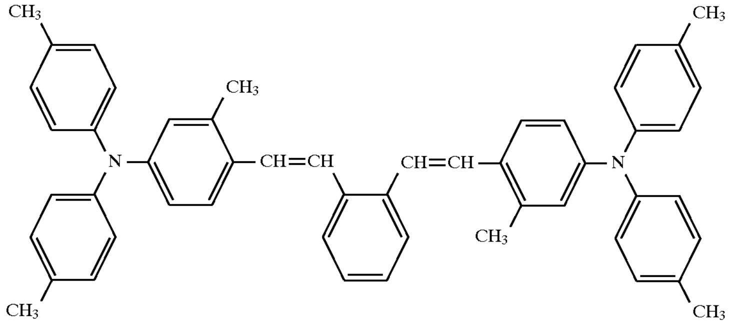

(III-93)

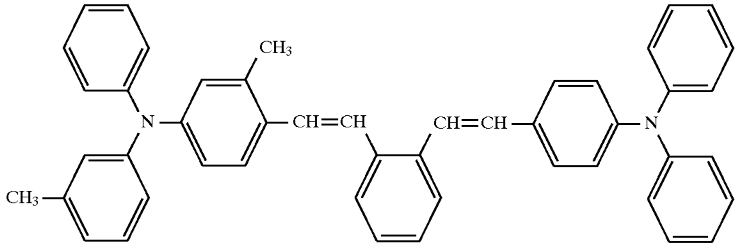

(III-94)

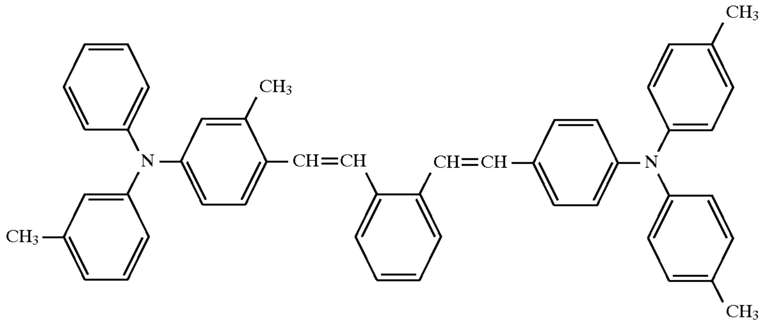

(III-95)

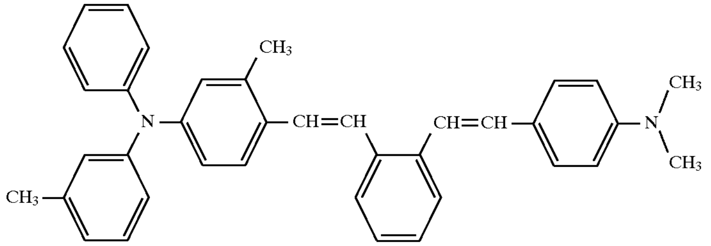

(III-96)

However, the material responsible for transporting charge carriers is not limited to one of the above compounds but also other materials which have been known in the art, for example hydrazone compounds described in the documents such as a specification of European Patent Application No-13172, pyrazoline compounds described in Japanese Patent Application Laying-open No. 49-105536, oxadiazole compounds described in Japanese Patent Application Laying-open No. 54-112637 and U.S. Pat. No. 318,944, styryl compounds referenced in Japanese Patent Application Laying-open No. 50-3173, arylamine compounds described in U.S. Pat. No. 3,567,450, Japanese Patent Application Publication No. 49-35702, German Patent No. 1110518, U.S. Pat. No. 3,180,703, U.S. Pat. No. 3,240,597, U.S. Pat. No. 3,658,520, U.S. Pat. No. 4,232,103, U.S. Pat. No. 4,175,961, U.S. Pat. No. 4,012,376, Japanese Patent Application Laying-open No, 55-144250, Japanese Patent Application Laying-open No- 56-119132, and Japanese Patent Application Publication No, 39-27577, oxazole compounds described in U.S. Pat. No. 3,543,546, pyrazoline and pyrazolone compounds described in U.S. Pat. No. 3,180,729 and Japanese Patent Application Laying-open No. 49-105536, polyarylalkane compounds described in U.S. Pat. No. 3,615,402, U.S. Pat. No. 3,820,989, U.S. Pat. No. 3,542,544, Japanese Patent Application Publication No. 45-555, and Japanese Patent Application Publication No. 51-10983, polyvinylcarbazole compounds and their derivatives described in Japanese Patent Application Publication No. 34-10966, polymers of N-acrylamide methylcarbazole described in Japanese Patent Application Laying-open 50-85337, 6-vinylindro-(2,3-6)-quinoxaline polymers described in Japanese Patent Application Laying-open 50-93432, vinyl polymers described in Japanese Patent Application Publication No. 43-18674 and Japanese Patent Application Publication No. 43-19192, triphenylmethane polymers described in Japanese Patent Application Laying-open No. 56-90883 and Japanese Patent Application Laying-open No. 56-161550, styrene copolymers described in Japanese Patent Application Publication No. 43-19193, polyindene, polyacenaphthene, copolymers of styrene with acenaphthylene, and formaldehyde condensation resin described in Japanese Patent Application Publication No. 56-13940. It these charge-carrier transport materials have the abilities of forming their films, they can be used in the form of aqueous solution and applied on a substrate to make a charge generation layer. In the case of low molecular weight compound which does not show the ability of forming its film, however, it may be solved in an aqueous solution with a resin having the ability of film-formation. In general, the thickness of charge transport layer is preferably in the range of 5 $\mu$m to 40 $\mu$m.

The above photosensitive layer 4 may be optionally comprised of an electron acceptor for the purpose of increasing photo sensitivity and preventing the decrease in residual potential, and the change in electrophotographic characteristics in repeat use. The material to be used as an electron acceptor can be selected from succinic anhydride, maleic anhydride, dibromsuccinic anhydride, phthalic anhydride, 3-nitrophtalic anhydride, 4-nitrophtalic anhydride, pyromellitic anhydride, pyromellitic acid, trimellitic acid, trimellitic anhydride, phthalimide, 4-nitrophthalimide, tetracyanoethylene, tetracyanoquinodimethane, chloranil, and bromanil, o-nitrobenzoic acid, and the like, which are characterized by their good electron affinities.

In the above photosensitive layer 4, furthermore, at least one of deterioration-preventing agents such as anti-oxidizing agents and light-stabilizing agents may be included for improving the stabilities thereof to harmful light and on the environmental conditions. The material to be used for attaining that purpose may be selected from chromanol derivatives such as tocopherol and their etherified compounds or esterified compounds, polyarylalkane compounds, hydroquinone derivatives and their mono-etherified compounds or di-esterified compounds, benzophenone derivatives, benzotriazole derivatives, thioetherified compounds, phenylene diamine derivatives, phosphonate, phosphite, phenol compounds, hindered phenol compound, straight-chain amine compounds, cyclic amine compounds, hindered amine compounds, and the like.

Each layer of the photoreceptor of the present invention can be formed by using the well-known device such as dip coater, spray coater, wire-bar coater, applicator, doctor blade, roller coater, curtain coater, and bead coater.

Preferable embodiments of the present invention will now be described in detail. However, the present invention is not to be restricted to these embodiments. In the embodiments, "parts" denotes "parts by weight" and "%" denotes "weight %".

First of all, the process for preparing titanyloxyphthalocyanine of the present invention will be explained.

<EXAMPLE 1>

Titanyloxyphthalocyanine in accordance with the present invention was prepared by the following process.

(1) Preparation of amorphous titanyloxyphthalocyanine

At first, amorphous titanyloxyphthalocyanine was prepared as follows.

128 parts of phthalodinitrile were placed in four-necked flask (2 litters in volume) attached with a stirring device and a cooling device. Then 1000 parts of quinoline were added therein. After that, 47.5 parts of titanium were dropped into the flask and then the flask was heated up to 200° C.±10° C. to start a reaction. After the reaction at 200° C.±10° C. for 8 hours, the flask was cooled and its contents was filtrated at the temperature of 130° C. and washed by 500 parts of quinoline heated at 130° C. Further the filtrate was washed by N-methyl-2-pyrolidone heated at 130° C. until the filtrate became transparent. Then the filtrate was washed by ethanol and water in that order until a solvent was gone from a wet cake. The obtained wet cake was dispersed into 1000 parts of 3% sodium hydroxide and then heated at 4 hours. Then it was filtrated and washed to obtain a neutral filtrate. The filtrate was further washed by methanol and acetone. Then the purification step of washing the filtrate by alkali-acid-methanol-acetone system was repeated several times until the filtrate after washing by methanol and acetone becomes colorless and transparent. Consequently, the total yield of product was 101.2 parts.

Figure 1:
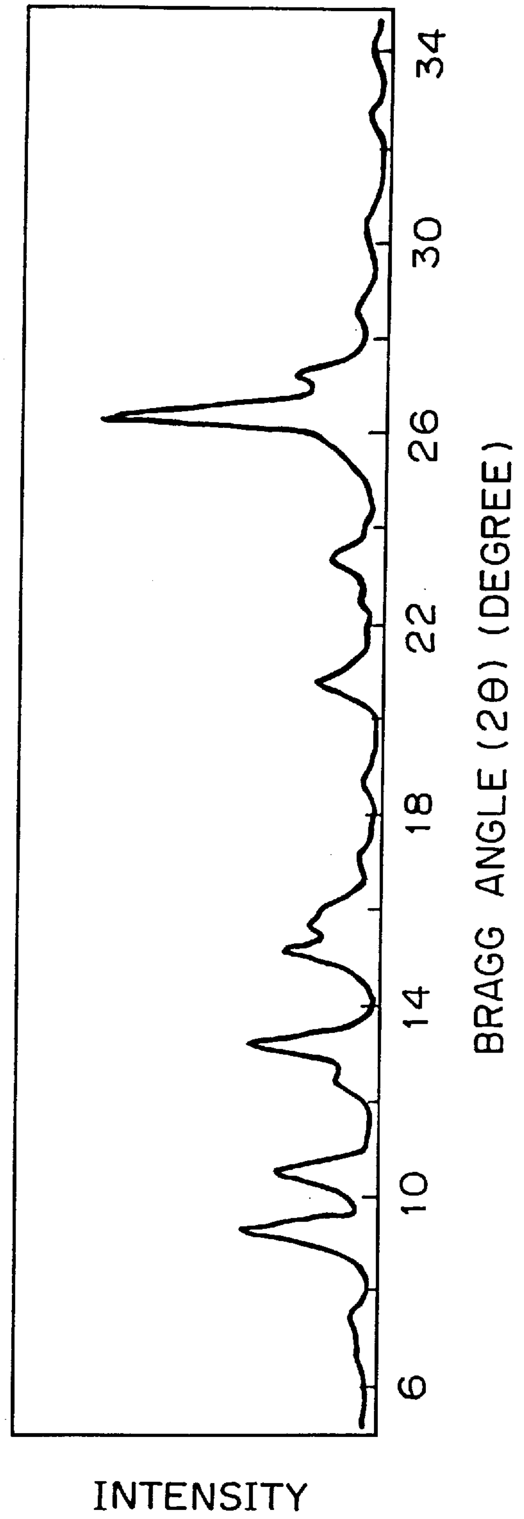
FIG. 1 is a pattern of an X-ray diffraction spectrum of titanyloxyphthalocyanine crystal (I-type) disclosed in Japanese Patent Application Laying-open No 62-67094.
Figure 2:
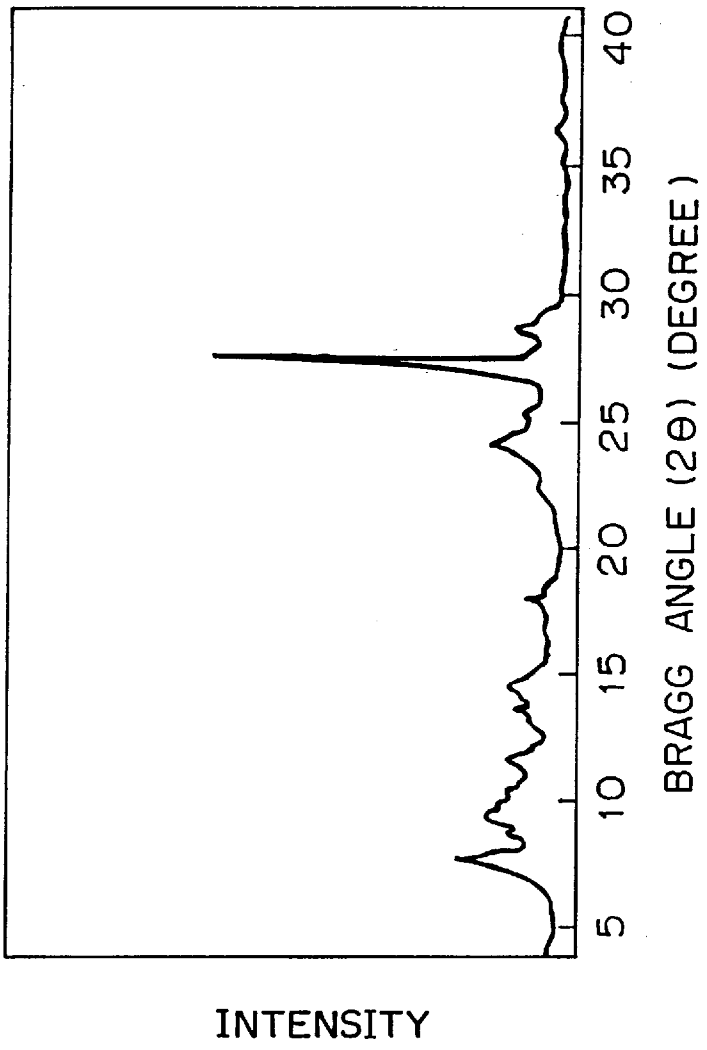
FIG. 2 is a pattern of an X-ray diffraction spectrum of titanyloxyphthalocyanine crystal (II-type) disclosed in Japanese Patent Application Laying-open No. 62-67094.
Figure 4:
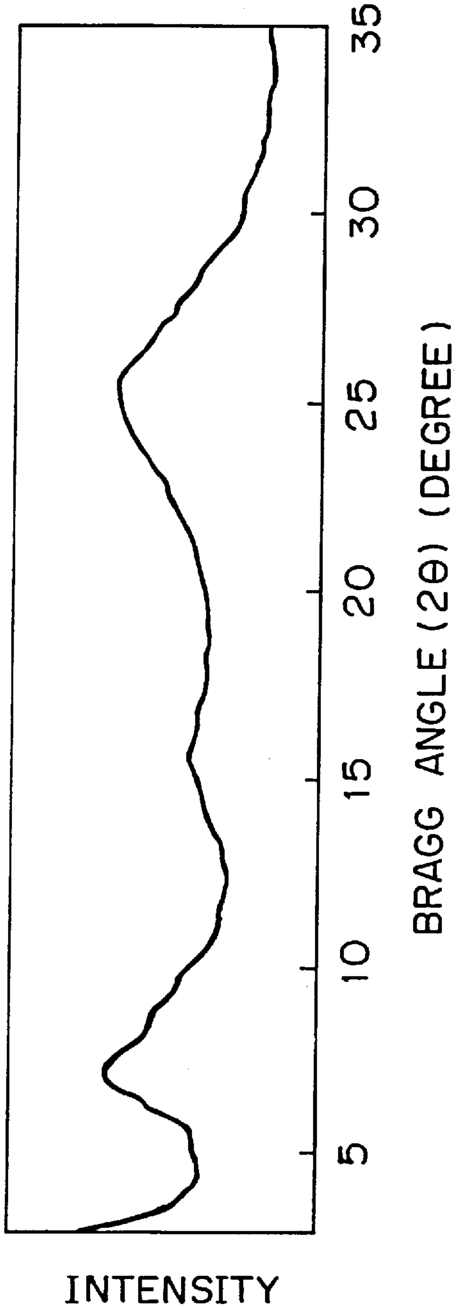
FIG. 4 is a pattern of an X-ray diffraction spectrum of titanyloxyphthalocyanine crystal (amorphous type)

The purity of the product was analyzed by a field desorption mass spectrometry (FDMS). The resultant spectrum showed a single peak at the molecular weight of 576, corresponding to that of the purified titanyloxyphthalocyanine. The titanyloxyphthalocyanine was further subjected to the analysis of X-ray diffraction spectrum. The resultant spectrum is almost the same as the one shown in FIG. 1. It means that the crystal form of the product corresponded to that of the type I described in Japanese Patent Application Laying-open No. 62-67094. Then 50 parts of the titanyloxyphthalocyanine was gradually added into 750 parts of concentrated ammonium sulfate cooled at under −10° C. For keeping the temperature at least under −5° C., the ammonium sulfate was being stirred and cooled. The mixture was further stirred for 2 hours and then added into ice-water (0° C.), resulting that a blue material was precipitated. The blue material was washed and filtrated, and then dispersed in 500 parts of 2% sodium hydroxide aqueous solution. The mixture was heated and then washed by water until the filtrate becomes neutral, perfectly. Then the filtrate was dried to obtain titanyloxyphthalocyanine as a product. Consequently, the total yield of product was 47 parts. The titanyloxyphthalocyanine was further subjected to the analysis of X-ray diffraction spectrum. The resultant spectrum was almost the same as the one shown in FIG. 4 in which any peak of diffraction intensity was not observed, so that the product was amorphous.

(2) Preparation of titanyloxyphthalocyanine crystal

A mixture of 40 parts of the amorphous titanylphthalocyanine obtained by the above steps, 100 parts of sodium chloride, and 400 parts of water was introduced into a sand mill filled with zirconia beads. The mixture was dispersed and granulated at a room temperature for 3 hours. Then 200 parts of dichlorotoluene was added in the sand mill. The sand mill was driven in succession. During the movement of the sand mill, titanyloxyphthalocyanine was gradually shifted from a water phase to an oil layer phase. In this case, water being separated was removed during the period of performing the above dispersion and granulation for 3 hours. Then the content was taken out from the sand mill and then dichloroethane was distillated by means of steam distillation. After the distillation, the remaining titanyloxyphthalocyanine was filtrated with water and then dried. The resultant titanyloxyphthalocyanine was subjected to a X-ray diffraction method using CuKα as a source of radiation, resulting in a X-ray diffraction spectrum which is the same as the one shown in FIG. 5. In the figure, the maximum diffraction intensity was observed at a Bragg angle (2θ) of 9.6°±0.2° and peaks of diffraction intensity were observed at Bragg angles (2θ) of 7.22°±0.2°, 9.60°±0.2°, 11.60°±0.2°, 13.40°±0.2°, 14.88°±0.2°, 18.34°±0.2°, 23.62°±0.2°, 24.14°±0.2°, and 27.32°±0.2°, respectively. Thus the titanyloxyphthalocyanine crystal of the present invention was obtained.

Furthermore, a result of the structural analysis using X-ray indicates that the obtained titanyloxyphthalocyanine crystal had a lattice constant of: a=16.3058 Å, b=23.078 Å, c=8.7155 Å, α=101.352°, β=23.078°, and γ=117.530°, with an allowable error of ±1%.

<EXAMPLE 2>

A mixture of 40 parts of the amorphous titanylphthalocyanine obtained by the process (1) of Example 1, 100 parts of sodium chloride, and 400 parts of water was introduced into the same sand mill as that of Example 1 for dispersing and granulating at a room temperature for 3 hours. Then the content of the sand mill was transferred into a twin-screw kneader. In addition, 20 parts of α-dichloronaphthalene was added therein, following that the kneader was driven. During the period of driving the kneader, titanyloxyphthalocyanine was gradually shifted from a water phase to oil layer phase. In this case, water being separated was removed during the period of performing the above dispersion and granulation for 3 hours. Then the content was taken out from the kneader and then α-dichloronaphthalene was distillated by means of steam distillation. After the distillation, the remaining titanyloxyphthalocyanine was filtrated with water and then dried. The resultant titanyloxyphthalocyanine showed the same X-ray diffraction spectrum as that of the one shown in FIG. 5. Thus the titanyloxyphthalocyanine crystal of the present invention was obtained.

<EXAMPLE 3 >

A mixture of 40 parts of the amorphous titanylphthalocyanine obtained in the first example, 100 parts of sodium chloride, and 400 parts of water was introduced into a ball mill filled with zirconia balls for dispersing and granulating at a room temperature for 3 hours. Then 200 parts of dichlorotoluene was added in the ball mill. The ball mill was driven in succession. During the movement, titanyloxyphthalocyanine was gradually shifted from a water phase to oil layer phase. In this case, water being separated was removed during the period of performing the above dispersion and granulation for 8 hours. Then the content was taken out from the and then remaining dichlorotoluene was distillated by means of steam distillation. After the distillation, the remaining titanyloxyphthalocyanine was filtrated with water and then dried. The resultant titanyloxyphthalocyanine showed the same X-ray diffraction spectrum as that of the first embodiment shown in FIG. 5.

Thus the titanyloxyphthalocyanine crystal of the present invention was obtained.

<Comparative example 1>

In this comparative example, titanyloxyphthalocyanine was crystallized in accordance with the method disclosed in Japanese Patent Application Laying-open No. 2-131243. That is, 5 g of titanyloxyphthalocyanine was stirred in 100 g of 90% sulfuric acid at 3° C. to 5° C. for 2 hours and then the obtained mixture was filtrated. After the filtration, the sulfuric acid solution was dropped into 3 litters of water to precipitate a bulk of crystals. The obtained crystals were washed by deionized water. The washing was repeated until the filtrate becomes neutral, resulting that a wet cake was obtained. Successively, o-dichlorobenzene was added in the wet cake as a dispersion medium and then the mixture was milled by sand grinder at a room temperature. The dispersion medium was removed from the sand grinder, following that the content thereof was washed by acetone and methanol to obtain a bulk of distinct blue crystals. A X-ray diffraction spectrum of the resultant titanyloxyphthalocyanine crystal was characterized by having the maximum peak of diffraction intensity at Bragg angle (2θ) of 27.3°. In the range of 6° to 8°, the maximum peak of diffraction intensity was observed at Bragg angle (2 θ) of 6.8°. Consequently, the product was of the same crystal form as that of the crystal disclosed in Japanese Patent Application Laying-open No. 2-131243.

<Comparative example 2>

Figure 3:
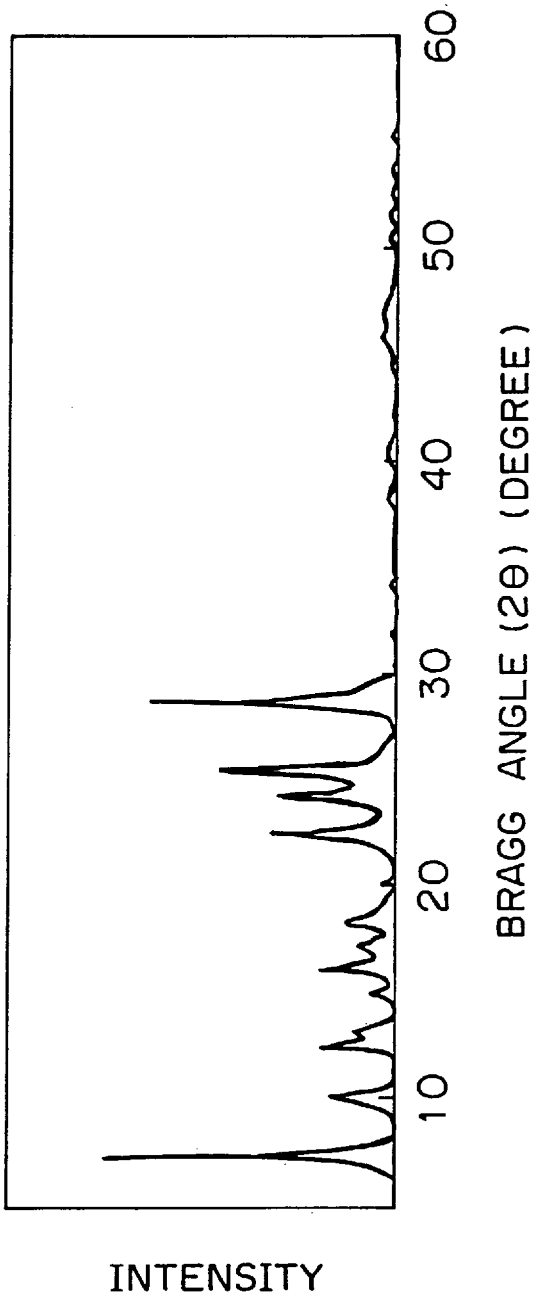
FIG. 3 is a pattern of an X-ray diffraction spectrum of titanyloxyphthalocyanine crystal (α-type) disclosed in Japanese Patent Application Laying-open No. 62-134651.

In this comparative example, α-titanyloxyphthalocyanine was prepared by the method disclosed in Japanese Patent Application Laying-open No.62-134651. That is, a mixture of 40 g of phthalodinitrile, 18 g of titanium tetrachloride, and 500 cc of chloronaphthalene was stirred at the temperature of 240° C. to 250° C. for 3 hours in nitrogenous atmosphere to completely react with each other. The mixture was filtrated after the reaction, and as a result dichlorothitanium phthalocyanine was obtained. The obtained dichlorothitanium was mixed with 300 cc of concentrated ammonium solution to obtain a mixture. Then the mixture was heat-refluxed for 1 hour and subjected to the purification by using a Soxhlet extractor. Consequently, titanyloxyphthalocyanine was obtained by drying the purified product. The resultant titanyloxyphthalocyanine was confirmed as α-type crystal having an X-ray diffraction spectrum which is the same as the one shown in FIG. 3.

[Dispersion stability of coating solution for charge generation layer, external appearance of charge generation layer, and photoreceptor image]

The titanyloxyphthalocyanine samples obtained by Example 1 and Comparative examples 1 and 2 were used in the process of forming photoreceptors, respectively. For each titanyloxyphthalocyanine, that is, a coating solution for preparing a charge generation was prepared. The coating solution was left alone for observing the change in dispersion conditions of just after the preparation and after 3-weeks left. Also, an external appearance of the charge generation layer applied by a dip-coating method was observed. Furthermore, an image of each photoreceptor prepared by using the charge generation layer coating solution of just after the preparation and after 3-weeks left was estimated.

2 parts of titanyloxyphthalocyanine obtained by the above examples and comparative examples was dispersed with a resin solution in a ball mill for 6 hours. In this case, the resin solution was prepared by dissolving 97 parts of tetrahydrofuran in vinyl chloride—vinyl acetate copolymer resin (Trade name: VMCH manufactured by Union Carbide Co., LTD.). Consequently, coating solutions No. 1 to No. 4 for preparing charge-generation layers were obtained as listed in Table 2 below.

TABLE 2

| Coating solution No. | Charge-generating material (Crystal form or maximum Bragg angle) |
|---|---|
| 1 | Example 1(2) (novel type) |
| 2 | Example 1(1) (I-type) |
| 3 | Comparative example 2 (α-type) |
| 4 | Comparative example 1 (27.3°) |

The dispersed conditions of these coating solutions were observed just after the preparation and after standing for 3 weeks.

A coating solution was applied on an outer peripheral surface of an aluminum cylinder (30 Å@mm in outer diameter) by using a wire-bar coater. In this case, the coating solution was prepared by dissolving 10 parts of copolymer nylon (6,66,610 nylon, trade name "ALAMIN CM8000" manufactured by Toray Co., LTD.) with 190 parts of ethanol in a ball mill by stirring them for 3 hours. The applied solution on the cylinder was dried at 100° C. for 1 hour, resulting that a under-coating layer of 0.5 μm in thickness was formed.

Each of the above coating solutions for the charge generation layers just after the preparation and after the 3-weeks left was applied on the under-coating layer to form a charge generation layer. The applied solution was dried at 100° C. for 2 hours. The resultant charge generation layer was of 0.3 μm in thickness and its external appearance was visually observed.

Furthermore, another coating solution was prepared by dissolving charge transport material was prepared by dissolving 10 parts of 1-phenyl-1, 2,3,4-tetrahydroquinoline-6-calboaldehyde-1',1'-diphenylhydrazone and 10 parts of polycarbonate resin (bis-phenol A-type polycarbonate, trade name "PANLITE" manufactured by Teijin Kasei Co., LTD.) in 100 parts of methylene chloride. The prepared coating solution was applied on each charge-generation layer described above and then dried to form a charge transport layer of 15 μm in thickness. Consequently, photoreceptors, which is correspond to the coating solutions Nos.1–4 respectively, were obtained.

The resultant photoreceptors were subjected to the test of forming an image by using a commercially-obtainable semiconductor laser beam printer to estimate their electrophotographic characteristics. The results were listed in Table 3.

TABLE 3

(1) Initial condition of dispersing a coating solution for applying a charge generation layer

| Photo-recep. NO. | Coating Sol. No. | Dispersion | Appearance | Image quality |
|---|---|---|---|---|
| 1 | 1 | – | – | – |
| 2 | 2 | – | – | – |
| 3 | 3 | – | – | – |
| 4 | 4 | – | – | – |

In the table, "–" means that materials were homogeneously dispersed in the coating solution, good external appearance of the coating solution was obtained, or good image quality was attained by using the photoreceptor.

(2) Condition of dispersing a coating solution for applying a charge generation layer after resting for 3 weeks.

| Photo-recep. NO. | Coating Sol. No. | Dispersion | Appearance | Image quality |
|---|---|---|---|---|
| 1 | 1 | – | – | – |
| 2 | 2 | + | + | + |
| 3 | 3 | + | + | + |
| 4 | 4 | ++ | ++ | ++ |

In the table, "–" means that materials were homogeneously dispersed in the coating solution, good external appearance of the coating solution was obtained, or good image quality was attained by using the photoreceptor; "+" means that a partial precipitation or a partial agglutination was observed in the coating solution, or image having many black dot noises was observed by using the photoreceptor; and "++" means that a lot of precipitations or a lot of agglutination with uneveness was observed in the coating solution, or image having many black dot noises with uneveness was observed by using the photoreceptor.

As shown in the table, the coating solution in accordance with the present invention did not cause agglutination and precipitation in spite of after standing for 3 weeks. Whether the time proceeds or not, consequently, the excellent charge generation layers were obtained without changing the coating conditions. The resultant charge generation layers did not have any troubles of agglutination and unevenness of coated surface. As a result, an image formed on the photoreceptor comprising one of the above charge generation layers did not show any defects to be caused by the agglutination and unevenness of coated surface of the charge generation layer. Furthermore, the photoreceptor did not cause a memory phenomenon.

[Photoreceptor preparation and characteristics evaluation]

Plate-type photoreceptors were prepared for the evaluation of their electrical characteristics. These plate-type photoreceptors were prepared by using different titanyloxyphthalocyanines described previously as their charge generation materials; different charge transport materials to be combined with the above charge generation materials; and different under-coating layers, respectively.

<EXAMPLE 4>

First of all, a coating solution was prepared by the steps of adding 10 parts of copolymerized nylon (trade name "AMILAN CM8000" manufactured by Toray Co., LTD.) and 190 parts of ethanol into a ball mill and stirring them for 3 hours to mix and dissolve. The obtained coating solution was applied on an aluminum base plate by means of a wire-bar coater and then dried at 100° C. for 1 hour, resulting that a under-coating layer of 0.5 μm in thickness was formed. Then the above coating solution of No. 1 for charge generation layers was applied and dried at 100° C. for 2 hours, resulting that a charge generation layer of 0.3 μm in thickness was formed. Next, another coating solution for preparing a charge transport layer, which was prepared by dissolving 10 parts of 1-phenyl-1,2,3,4-tetrahydroquinoline-6-carboaldehyde-1',1'-diphenylhydrazone and 10 parts of polycarbonate resin (trade name "VMCH" manufactured by Union Carbide Co., LTD.) in 100 parts of methylene chloride, was applied on the charge generation layer and then it was dried to form a charge transport layer.

The electrical characteristics of the photoreceptor was estimated by using an electrostatic recording paper testing device (trade name "SP-428" manufactured by Kawaguchi Denki Seisakusho).

A surface of the photoreceptor was charged by a corona discharge of a corotron system in darkness. In this case, a discharge voltage was regulated so as to charge the photoreceptor's surface at a charged potential Vo of −600V. Then the corona discharge was switched off and the photoreceptor was illuminated by light with a wavelength of 780 nm after placing in darkness for 5 seconds. The wavelength of the light was determined so as to correspond to an oscillation wavelength of 760 nm to 800 nm of semiconductor laser to be used in a general laser printer. In addition, the light was monochromatic one generated from a 500 W xenon lamp as a light source through monochrometer. Photo-sensitivities of the photoreceptor was estimated by means of an exposure energy $E_{1/2}$ ($\mu$J/cm$^2$) at the time of a half decay of the surface potential. Furthermore, the residual potential VR5 was measured after 5 minutes passed from the end of illumination. Next, the discharge voltage was further regulated so as to be kept at a constant level. The steps of charging and exposing the photoreceptor were repeated continuously 10,000 times and then $v_o$, $E_{1/2}$, and $VR_5$ were measured and fatigue characteristics of the photoreceptor was estimated. The results were listed in Table 4 below, <Comparative Examples 3, 4, and 5>

The above steps were repeated to prepare the photoreceptors of Comparative examples 3, 4, and 5, excepting that the above coating solutions of Nos. 2, 3, and 4 in Table 2 for charge generation layers were used, respectively. The resulting photoreceptors were subjected to the above tests to estimate their photo-sensitivities. The results were listed in Table 4 below.

TABLE 4

Electrophotographic characteristics of photoreceptor before and after repeating the cycle 10,000 times

| Photoreceptor | Coating Solution | State | $V_o$ (−V) | $V_{R5}$ (−V) | $E_{1/12}$ ($\mu$J/cm$^2$) |
|---|---|---|---|---|---|
| Example 1 | No. 1 | Before | 600 | 5 | 0.09 |
| | | After | 602 | 6 | 0.10 |
| Comparative Examples | | | | | |
| 3 | No. 2 | Before | 603 | 20 | 0.42 |
| | | After | 625 | 30 | 0.50 |
| 4 | No. 3 | Before | 605 | 12 | 0.31 |
| | | After | 610 | 22 | 0.32 |
| 5 | No. 4 | Before | 601 | 7 | 0.16 |
| | | After | 570 | 15 | 0.19 |

As shown in Table 4, the photoreceptor of Example 3 using the titanyloxyphthalocyanine crystal of Example 1 had the highest sensitivity compared with others and had good fatigue characteristics. Therefore, the titanyloxyphthalocyanine of the present invention attains superiority over others with respect to be used as a charge-generation layer.

<EXAMPLE 5>

An under-coating layer was applied on a base plate by the same way as that of Example 3. On the under-coating layer, a coating solution for preparing charge generation layer was applied and dried at 100 ° C. for 2 hours, resulting that a charge generation layer of 0.3 $\mu$m in thickness was formed. By the way, the above coating solution for preparing charge generation layer was prepared by dispersing 2 parts of the titanyloxyphthalocyanine obtained by the method of Example 1 and a resin solution where 97 parts of tetrahydrofuran was dissolved in vinyl chloride-vinyl acetate copolymer resin (trade name "VMCH" manufactured by Union Carbide Co., LTD.) in a ball mill for 6 hours.

Furthermore, another coating solution, which was prepared by dissolving 10 parts of hydrazone compound (II-5) and 10 parts of polycarbonate resin (trade name "PANLITE" manufactured by Teijin Kasei Co., LTD) in 100 parts of methylene chloride, was applied on the above charge generation layer and dried to obtain a charge transport layer. The resultant charge transport layer was of 15 $\mu$m in thickness. As a result, a photoreceptor was formed.

<EXAMPLE 6>

A photoreceptor was prepared by the same way as that of Example 5 except hydrazone compound. In this example, that is, a hydrazone compound (II-9) was used as a charge transporting material instead of the hydrazone compound (II-5).

<EXAMPLE 7>

A photoreceptor was prepared by the same way as that of Example 5 except hydrazone compound. In this example, that is, a hydrazone compound (II-15) was used as a charge transporting material instead of the hydrazone compound (II-5).

<Comparative example 6>

A photoreceptor was prepared by the same way as that of Example 5 except charge generation material. In this example, that is, the titanyloxyphthalocyanine of Comparative example 1 was used as a charge transporting material instead of that of Example 5.

<Comparative example 7>

A photoreceptor was prepared by the same way as that of Example 5 except charge generation material. In this example, that is, the titanyloxyphthalocyanine of Comparative example 1 was used as a charge transporting material instead of that of Example 5.

<Comparative example 8>

A photoreceptor was prepared by the same way as that of Example 5 except charge generation material. In this example, that is, the titanyloxyphthalocyanine of Comparative example 2 was used as a charge transporting material instead of that of Example 5.

<Comparative example 9>

A photoreceptor was prepared by the same way as that of Example 5 except hydrazone compound. In this example, that is, a compound (H-1) having the following structure was used as a charge transporting material instead of the hydrazone compound (II-5).

(H-1)

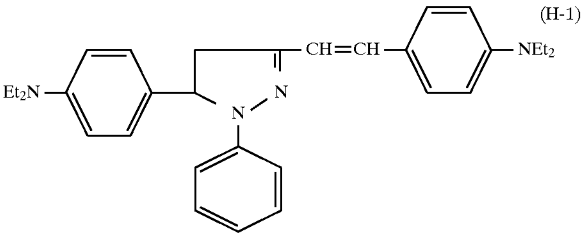

The photoreceptors of Examples 5 to 7 and Comparative examples 1 to 4 were subjected to the same test as that of Example 1 for estimating the electrical characteristics of each photoreceptor. The results were listed in Table 5.

TABLE 5

Electrophotographic characteristics of photoreceptor before and after repeating the cycle

| Photoreceptor | State | $V_o$ (−V) | $V_{R5}$ (−V) | $E_{1/12}$ ($\mu J/cm^2$) |
|---|---|---|---|---|
| Example | | | | |
| 5 | Before | 600 | 5 | 0.09 |
| | After | 602 | 6 | 0.10 |
| 6 | Before | 601 | 8 | 0.10 |
| | After | 602 | 10 | 0.12 |
| 7 | Before | 600 | 5 | 0.12 |
| | After | 601 | 7 | 0.12 |
| Comparative Example | | | | |
| 6 | Before | 602 | 20 | 0.42 |
| | After | 625 | 30 | 0.50 |
| 7 | Before | 601 | 7 | 0.12 |
| | After | 570 | 15 | 0.16 |
| 8 | Before | 605 | 12 | 0.31 |
| | After | 610 | 22 | 0.32 |
| 9 | Before | 601 | 6 | 0.10 |
| | After | 620 | 25 | 0.28 |

As shown in Table 5, it is evident that the photoreceptor having the combination of the titanyloxyphthalocyanine crystal of the present invention and the hydrazone compound attains superiority over others.

<EXAMPLE 8>

An under-coating layer and a charge generation layer was formed on a base plate by the same way as that of Example 2 except that the charge transport layer. In this example, that is, a charge transport layer was formed by the steps of preparing a coating solution by dissolving 10 parts of distyryl compound (III-2) as a charge transport material and 10 parts of polycarbonate resin in 100 parts of methylene chloride; applying the coating solution on a surface of the charge generation layer; and drying the applied coating solution. The resultant charge transport layer was of 15 $\mu$m in thickness. Consequently, a photoreceptor was obtained.

EXAMPLE 9>

A photoreceptor was prepared by the same way as that of Example 8, excepting that a distyryl compound (III-19) as a charge transport material was used in stead of the distyryl compound (III-2).

<EXAMPLE 10>

A photoreceptor was prepared by the same way as that of Example 8, excepting that a distyryl compound (III-50) as a charge transport material was used in stead of the distyryl compound (III-2).

<EXAMPLE 11>

A photoreceptor was prepared by the same way as that of Example 8, excepting that a distyryl compound (III-74) as a charge transport material was used in stead of the distyryl compound (III-2).

<EXAMPLE 12>

A photoreceptor was prepared by the same way as that of Example 8, excepting that a distyryl compound (III-92) as a charge transport material was used in stead of the distyryl compound (III-2).

<Comparative example 10>

A photoreceptor was prepared by the same way as that of Example 5 except charge generation material. In this example, that is, the titanyloxyphthalocyanine of the process (2) of Example 1 was used as a charge transporting material instead of that of the process (1) of Example 1.

<Comparative example 11>

A photoreceptor was prepared by the same way as that of Example 8 except charge generation material. In this example, that is, the titanyloxyphthalocyanine of Comparative example 1 was used as a charge transporting material instead of that of the process (2) of Example 1.

<Comparative example 12>

A photoreceptor was prepared by the same way as that of Example 8 except charge generation material. In this example, that is, the titanyloxyphthalocyanine of Comparative example 2 was used as a charge transporting material instead of that of the process (2) of Example 1.

<Comparative example 13>

A photoreceptor was prepared by the same way as that of Example 8 except charge generation material. In this example, that is, 1-phenyl-3-(p-diethylaminostyryl)-5-(p-diethylaminophenyl)-2-p-pyrazoline (ASPP) was used as a charge transporting material instead of the titanyloxyphthalocyanine obtained in the process (2) of Example 1.

<Comparative example 13>

A photoreceptor was prepared by the sate way as that of Example 8 except charge generation material. In this example, that is, p-diethylaminobenzaldehyde-diphenylhydrazone (ABPH) was used as a charge transporting material instead of the titanyloxyphthalocyanine obtained in the process (2) of Example 1.

The electrical characteristics of each photoreceptor was estimated by using an electrostatic charging testing device EPA-3100 manufactured by Kawaguchi Denki Seisakusho.

A surface of the photoreceptor of Example 5 was charged by a corona discharge of a corotron system in darkness. In this case, a discharge voltage was regulated so as to charge the photoreceptor's surface at a charged potential $V_o$ of −600V. Then the corona discharge was switched off and the photoreceptor was illuminated by light with a wavelength of 780 nm after placing in darkness for 5 seconds. The wavelength of the light was determined so as to correspond to an oscillation wavelength of 760 nm to 800 nm of semiconductor laser to be used in a general laser printer. In addition, the light was monochromatic one generated from a 100 W halogen lamp as a light source through an optical filter and illuminated on the photoreceptor's surface at 0.7 $\mu W/cm^2$.

Photo-sensitivities of each photoreceptor was estimated by means of an exposure energy $E_{1/2}$ ($\mu J/cm^2$) at the time of a half decay of the surface potential Furthermore, the residual potential VR5 was measured after 5 minutes passed from the end of illumination. Next, the discharge voltage was further regulated so as to be kept at a constant level. The steps of charging and exposing the photoreceptor were repeated continuously for 10,000 times and then $V_o$, $E_{1/2}$, and $V_{R5}$ were measured and fatigue characteristics of the photoreceptor was estimated. The results were listed in Table 6 below.

TABLE 6

Electrophotographic characteristics of photoreceptor before and after repeating the cycle

| Photoreceptor | State | $V_o$ (−V) | $V_{R5}$ (−V) | $E_{1/12}$ ($\mu J/cm^2$) |
|---|---|---|---|---|
| Examples | | | | |
| 8 | Before | 600 | 8 | 0.12 |
| | After | 610 | 18 | 0.14 |
| 9 | Before | 601 | 10 | 0.14 |
| | After | 605 | 20 | 0.14 |
| 10 | Before | 601 | 9 | 0.12 |
| | After | 603 | 16 | 0.15 |
| 11 | Before | 600 | 7 | 0.11 |
| | After | 603 | 11 | 0.13 |
| 12 | Before | 602 | 11 | 0.11 |
| | After | 611 | 15 | 0.12 |
| Comparative Examples | | | | |
| 10 | Before | 600 | 22 | 0.52 |
| | After | 625 | 65 | 0.70 |
| 11 | Before | 603 | 7 | 0.12 |
| | After | 567 | 32 | 0.17 |
| 12 | Before | 605 | 12 | 0.31 |
| | After | 610 | 28 | 0.35 |
| 13 | Before | 601 | 9 | 0.35 |
| | After | 610 | 55 | 0.38 |
| 14 | Before | 601 | 12 | 0.25 |
| | After | 605 | 75 | 0.32 |

As shown in Table 6, it is evident that the photoreceptor having the combination of the titanyloxyphthalocyanine crystal of the present invention and the hydrazone compound attains superiority over others.

<EXAMPLE 13>

An aluminum cylinder of 30 mm in outer diameter, 28 m in inner diameter, 260.3 nm in length, and 1. 0 $\mu$m in surface roughness indicated by the maximum height ($R_{max}$) was used as a conductive substrate. An under-coating composition was applied on an outer peripheral surface of the aluminum cylinder to form an under-coating layer.

The under coating composition was selected from one of the following materials of A to D.

A melamine resin (n-butylated melamin resin, trade name "Uban 20HS" manufactured by Mitsui Toatsu Co., LTD)

B. acids (aromatic carboxylic acid, aromatic carboxylic acid chloride)

B1 phthalic acid

B2 ammonium benzoate

C. adipic acid

D. iodine

One of the above materials A to D and a solvent prepared by mixing dichloromethane with methanol (1:1) were used for preparing the under-coating layer coating solution having the composition shown in Table 7. The coating solution was dip-coated on the conductive substrate and dried at 120° C. for 1 hours to form an under-coating layer of 15 $\mu$m in thickness.

TABLE 7

| Under-coating solution No. | Composition of under-coating layer (parts by weight) Melamine | Acid | Iodine |
|---|---|---|---|
| 1 | A (100) | B1 (20) | (6) |
| 2 | A (100) | B1 (20) | (6) |
| 3 | A (100) | C (20) | (6) |
| 4 | A (100) | B1 (20) | (0) |

Furthermore, a charge generation layer and a charge transporting layer were formed on each of the above under-coating layers. That is, a coating solution was prepared by dispersing 2 parts of one of titanyloxyphthalocyanines prepared in Examples 1 and 2 and Comparative examples 1 and 2 and a resin solution where 97 parts of tetrahydrofuran was dissolved in vinyl chloride—vinyl acetate copolymer resin (trade name "VMCH" manufactured by Union Carbide, Co., LTD) in a ball mill for 6 hours Then the coating solution was applied on the under-coating layer and dried at 100° C. for 2 hours to form a charge generation layer of 0.3 $\mu$m in thickness. After forming the charge generation layer, the charge transport layer was formed thereon. That is, a coating solution, which is prepared by dissolving 10 parts of N,N-diethylaminobenzaldehydediphenylhydrazone and 10 parts of polycarbonate (trade name "PANLITE" manufactured by Teijin Kasei Co., LTD.) in 100 parts of methylene chloride, was applied on the charge generation layer and dried. The resultant charge transport layer was of 20 $\mu$m in thickness. Then these steps were repeated with respect to each of the above under-coating layer, resulting that 16 different photoreceptors were obtained as shown in Table 8 below.

TABLE 8

| Photoreceptor | Coating solution for under-coating layer | Charge-generation material |
|---|---|---|
| Example 13-1 | No. 1 | Example 1(2) |
| Example 13-2 | No. 2 | Example 1(2) |
| Example 13-1 | No. 3 | Example 1(2) |
| Example 13-2 | No. 4 | Example 1(2) |
| Example 13-3 | No. 1 | Example 2 |
| Example 13-4 | No. 2 | Example 2 |
| Comp. 15-3 | No. 3 | Example 2 |
| Comp. 15-4 | No. 4 | Example 2 |
| Comp. 15-5 | No. 1 | Comp. 1 |
| Comp. 15-6 | No. 2 | Comp. 1 |
| Comp. 15-7 | No. 3 | Comp. 1 |
| Comp. 15-8 | No. 4 | Comp. 1 |
| Comp. 15-9 | No. 1 | Comp. 2 |
| Comp. 15-10 | No. 2 | Comp. 2 |
| Comp. 15-11 | No. 3 | Comp. 2 |

In the table, "Comp." means "Comparative example".

Electrical characteristics of the photoreceptors thus obtained were evaluated by means of a photoreceptor-process testing machine. The photoreceptor was installed on the testing machine and rotated at the wind velocity of 78.5 mm/second. During the rotation, a surface of the photoreceptor was charged by a corotron system in darkness. In this case, a discharge voltage was regulated so as to charge the photoreceptor's surface at a charged potential $V_o$of −600V. Then the potential retention rate $V_{k5}$ (%) was estimated by measuring a potential after leaving the photoreceptor in darkness for 5 minutes. Then the photoreceptor was illuminated by light having the wavelength of 780 nm and a luminous flux density of 2 $\mu$W/$cm^2$. Blight potential $V_I$ was defined as a potential measured after the irradiation for 0.2 seconds.

The process comprising one cycle of charging and exposure was repeated 10,000 times and the characteristic changes were observed before and after 10,000 repetitions. The results were shown in Table 9.

TABLE 9

| | Before | | | After | | |
|---|---|---|---|---|---|---|
| Photoreceptor | $V_o$ (−V) | $V_{K5}$ (%) | $V_I$ (−V) | $V_o$ (−V) | $V_{K5}$ (%) | $V_I$ (−V) |
| Example 13-1 | 600 | 95 | 60 | 602 | 94 | 62 |
| Example 13-2 | 603 | 96 | 70 | 625 | 96 | 72 |
| Comp. 15-1 | 605 | 94 | 71 | 610 | 90 | 120 |
| Comp. 15-2 | 604 | 93 | 100 | 570 | 93 | 180 |
| Example 13-3 | 610 | 96 | 55 | 610 | 95 | 58 |
| Example 13-4 | 602 | 95 | 62 | 609 | 95 | 64 |
| Comp. 15-3 | 611 | 93 | 73 | 620 | 91 | 110 |
| Comp. 15-4 | 610 | 93 | 110 | 630 | 93 | 170 |
| Comp. 15-5 | 603 | 94 | 89 | 611 | 93 | 105 |
| Comp. 15-6 | 605 | 96 | 94 | 610 | 94 | 102 |
| Comp. 15-7 | 607 | 95 | 95 | 613 | 92 | 97 |
| Comp. 15-8 | 600 | 93 | 120 | 648 | 93 | 198 |
| Comp. 15-9 | 603 | 92 | 180 | 630 | 92 | 195 |
| Comp. 15-10 | 601 | 93 | 188 | 625 | 91 | 190 |
| Comp. 15-11 | 602 | 94 | 220 | 655 | 94 | 250 |
| Comp. 15-12 | 603 | 93 | 245 | 634 | 93 | 320 |

In the table, "Comp." means "Comparative example".

As shown in Table 9, the photoreceptor comprising the under-coating layer that does not include iodine have the high residual potential and insufficient electrophotographic characteristics in repeat use. In addition, the photoreceptor comprising the under-coating layer that includes iodine and using aliphatic carboxylic acid instead of aromatic carboxylic acid has the high bright potential $V_i$ and insufficient electrophotographic characteristics in repeat use. Furthermore, the photoreceptor comprising the under-coating layer that includes iodine and using aromatic carboxylic acid or its chloride has the high residual potential and insufficient electrophotographic characteristics in repeat use when the titanyloxyphthalocyanine of Comparative example 2. Also, a residual potential of the photoreceptor using the titanyloxyphthalocyanine of Comparative example 1 is increased in repeat use.

Furthermore, the changes in electrical characteristics of the photoreceptor were observed under the circumstances of:

HH: high temperature and humidity (35° C., 85% RH); or

LL: low temperature and humidity (10° C., 50% RH).

The results thus obtained were listed in Table 10.

TABLE 10

| | LL | | | HH | | |
|---|---|---|---|---|---|---|
| Photoreceptor | $V_o$ (−V) | $V_{K5}$ (%) | $V_I$ (−V) | $V_o$ (−V) | $V_{K5}$ (%) | $V_I$ (−V) |
| Example 13-1 | 600 | 94 | 60 | 603 | 94 | 44 |
| Example 13-2 | 603 | 95 | 70 | 627 | 96 | 62 |
| Comp. 15-1 | 605 | 94 | 71 | 612 | 90 | 66 |
| Comp. 15-2 | 601 | 93 | 100 | 588 | 93 | 107 |
| Example 13-3 | 610 | 96 | 55 | 613 | 95 | 55 |
| Example 13-4 | 602 | 95 | 62 | 614 | 95 | 61 |
| Comp. 15-3 | 611 | 91 | 88 | 622 | 91 | 77 |
| Comp. 15-4 | 610 | 91 | 110 | 620 | 93 | 107 |
| Comp. 15-5 | 633 | 91 | 89 | 621 | 93 | 77 |
| Comp. 15-6 | 650 | 921 | 94 | 613 | 94 | 88 |
| Comp. 15-7 | 640 | 92 | 95 | 615 | 92 | 98 |

TABLE 10-continued

| | LL | | | HH | | |
|---|---|---|---|---|---|---|
| Photoreceptor | $V_o$ (−V) | $V_{K5}$ (%) | $V_I$ (−V) | $V_o$ (−V) | $V_{K5}$ (%) | $V_I$ (−V) |
| Comp. 15-8 | 635 | 93 | 120 | 648 | 93 | 198 |
| Comp. 15-9 | 633 | 93 | 180 | 637 | 90 | 195 |
| Comp. 15-10 | 640 | 94 | 188 | 622 | 81 | 190 |
| Comp. 15-11 | 637 | 93 | 220 | 650 | 80 | 250 |
| Comp. 15-12 | 655 | 96 | 245 | 632 | 85 | 320 |

In the table, "Comp." means "Comparative example".

The photoreceptor thus obtained was placed in the laser-beam printer "Laser Jet 111" (trademark, manufactured by Hewlett Packerd Co., LTD.).

Image qualities were measured by counting the number of black dots having a diameter of 0.2 mm or over produced on the area with four equal sides of 90 mm in a surface of the photoreceptor. The measurements were performed at a beginning and at an end of printing 10,000 sheets of paper. The measurements were performed by under the circumstances of:

HH: high temperature and humidity (35° C., 85% RH);

NN: room temperature and humidity (10° C., 50% RH); or

LL: low temperature and humidity (10° C., 50% RH).

The results thus obtained were listed in Table 11.

In the table, each symbol indicates a number of the black dots:

"−" means N<5;

"+" means 5≦N<20;

"++" means 20≦N<50; and

"+++" means 50≦N.

TABLE 11

| | The number of black dots | | |
|---|---|---|---|
| Photoreceptor | LL | NN | HH |
| Example 10-1 | − | − | + |
| Example 10-2 | − | − | + |
| Comp. 10-1 | + | + | ++ |
| Comp. 10-2 | low conc. | + | ++ |
| Example 10-3 | − | − | + |
| Example 10-4 | − | − | + |
| Comp. 10-3 | + | + | ++(uneven) |
| Comp. 10-4 | low conc. | + | ++ |
| Comp. 10-5 | + | + | ++ |
| Comp. 10-6 | + | + | ++ |
| Comp. 10-7 | + | +(uneven) | ++(uneven) |
| Comp. 10-8 | low conc. | low conc. | + |
| Comp. 10-9 | low conc. | + | fogging |
| Comp. 10-10 | low conc. | + | fogging |
| Comp. 10-11 | low conc. | low conc. | memory |
| Comp. 10-12 | low conc. | low conc. | memory |

In the table, "Comp." means "Comparative example".

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A titanyloxyphthalocyanine crystal to be used as a charge generation material for an electrophotographic photoreceptor, having a maximum diffraction intensity observed at Bragg angle (2θ) of 9.6°±0.2° and clear peaks of diffraction intensity observed at 7.22°±0.2°, 9.60°±0.2°, 11.60°±0.2°, 13.40°±0.2°, 14.88°±0.2°, 18.34°±0.2°, 23.62°±0.2°, 24.14°±0.2°, and 27.32°±0.2°, respectively, in an X-ray diffraction spectrum obtained by performing an x-ray diffraction method using CuKα as a source of radiation.

2. A method for preparing a titanyloxyphthalocyanine to be used as a charge generation material for an electrophotographic receptor, comprising the steps of:

a. dispersing a predetermined amount of amorphous titanyloxyphthalocyanine in an aqueous solution in which ionic substances are dissolved, under mechanical force at a temperature of under 50° C., to obtain a mixture comprising a fine dispersion of titanyloxyphthalocyanine ;

b. adding a non-aqueous organic solvent to said mixture to shift the fine dispersion of titanyloxyphthalocyanine from an aqueous phase to a non-aqueous organic solvent phase; and c. removing said non-aqueous organic solvent phase to obtain a pellet of titanyloxyphthalocyanine crystal that has a maximum diffraction intensity observed at Bragg angle (2θ) of 9.6°±0.2° and clear peaks of diffraction intensity observed at 7.22°±0.2°, 9.60°±0.2°, 11.60°±0.2°, 13.40°±0.2°, 14.88°±0.2°, 18.34°±0.2°, 23.62°±0.2°, 24.14°±0.2°, and 27.32°±0.2°, respectively, in a X-ray diffraction spectrum obtained by performing a X-ray diffraction method using CuKα as a source of radiation.

3. A titanyloxyphthalocyanine crystal to be used as a charge generation layer for an electrophotoconductive photoreceptor, having a lattice constant of:

a=16.3058 Å, b=23.078 Å, c=8.7155 Å

α=101.352°, β=23.078°, and γ=117.53°, with an allowable error of ±1%.

4. A method for preparing a titanyloxyphthalocyanine crystal to be used as a charge generation material for an electrophotographic photoreceptor, comprising the steps of:

a. dispersing a predetermined amount of amorphous titanyloxyphthalocyanine in an aqueous solution in which ionic substances are dissolved, under mechanical force at a temperature of under 50° C., to obtain a mixture comprising a fine dispersion of titanyloxyphthalocyanine ;

b. adding a non-aqueous organic solvent to said mixture to shift the dispersion of titanyloxyphthalocyanine from an aqueous phase to a non-aqueous organic solvent phase; and c. removing said non-aqueous organic solvent phase to obtain a pellet of titanyloxyphthalocyanine crystal that has a lattice constant of:

a=16.3058 Å, b=23.078 Å, c=8.7155 Å

α=101.352°, β=23.078°, and γ=117.53°, with an allowable error of ±1%.

* * * * *

UNITED STATES PATENT AND TRADEMARK OFFICE

CERTIFICATE OF CORRECTION

PATENT NO. : 5,874,570
DATED : February 23, 1999
INVENTOR(S) : Shinichi Tamura et al.

It is certified that error appears in the above-identified patent and that said Letters Patent is hereby corrected as shown below:

Title page,
Item [63], should read as follows:

-- Related U.S. Application Data

[63] Division of Ser. No. 645,322, May 12, 1996, Patent No. 5,736,282, continuation of Ser. No. 562,348, Nov. 22, 1995, abandoned. --

Item [30], should read as follows:

-- [30] Foreign Application Priority Data

Nov. 24, 1994 [JP] Japan ........................... 6-289363
Nov. 10, 1995 [JP] Japan ........................... 7-292417 --

Signed and Sealed this

Tenth Day of December, 2002

JAMES E. ROGAN
*Director of the United States Patent and Trademark Office*